US012688086B2

(12) United States Patent
Kitagawa

(10) Patent No.: US 12,688,086 B2
(45) Date of Patent: Jul. 21, 2026

(54) VOTING SCHEME IN A MEMORY PAGE

(71) Applicant: Micron Technology, Inc., Boise, ID (US)

(72) Inventor: Makoto Kitagawa, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 37 days.

(21) Appl. No.: 18/440,067

(22) Filed: Feb. 13, 2024

(65) Prior Publication Data

US 2024/0281322 A1     Aug. 22, 2024

Related U.S. Application Data

(60) Provisional application No. 63/485,630, filed on Feb. 17, 2023.

(51) Int. Cl.
*G06F 11/00* (2006.01)
*G06F 11/10* (2006.01)

(52) U.S. Cl.
CPC ................................ *G06F 11/1004* (2013.01)

(58) Field of Classification Search
None
See application file for complete search history.

(56) References Cited

U.S. PATENT DOCUMENTS

| | | | |
|---|---|---|---|
| 2014/0036597 A1* | 2/2014 | Nakayama | G11C 16/26 365/185.21 |
| 2014/0062529 A1* | 3/2014 | Ramachandra | G06F 7/501 326/35 |
| 2014/0084959 A1* | 3/2014 | Youssefi | H03K 19/23 326/35 |
| 2014/0321192 A1* | 10/2014 | Bedeschi | G11C 13/0069 365/148 |
| 2016/0006459 A1* | 1/2016 | Hanham | H03M 13/1111 714/764 |
| 2020/0059252 A1* | 2/2020 | Fackenthal | H03M 13/43 |
| 2020/0169269 A1* | 5/2020 | Kwak | G06F 11/1068 |
| 2023/0062075 A1* | 3/2023 | Ioki | H03K 19/0948 |

* cited by examiner

*Primary Examiner* — Mujtaba M Chaudry
(74) *Attorney, Agent, or Firm* — Greenberg Traurig

(57) ABSTRACT

A system for providing a voting scheme in a memory page is disclosed. The system receives a request from a host device for data. The system identifies a memory page of a memory array of a memory device storing data bits corresponding to the requested data. The data bits are transferred from memory cells of the memory page to sense amplifiers to sense the values of the data bits. Inversion bits for the row address(es) of the memory page are transferred to a voting circuit to conduct a vote using the inversion bits. If the vote indicates that the data bits are inverted, the system flips the data bits prior to providing the data bits to the host device. If the vote indicates that the data bits are not inverted, the system provide the data bits to the host device without flipping the data bits.

20 Claims, 12 Drawing Sheets

400

405

410

Voting Component

415

600

Memory Page

CA<1:0>

LL — 602

LH — 604

HL — 606

HH — 608

630

620
x256 Regular
User Bits x5
Ecc 632
Bits 634
x5
Redundancy
Bits

636 Inversion
x5
Bits

900

Memory Page

CA<1:0>

LL — 902
LH — 904
HL — 906
HH — 908

930 x256 Regular
User Bits
920 x5
Ecc
Bits    932 x5 934
Redundancy
Bits 936 x5
Inversion
Bits

VOTING SCHEME IN A MEMORY PAGE

RELATED APPLICATIONS

The present application claims priority to Prov. U.S. Pat. App. Ser. No. 63/485,630 filed Feb. 17, 2023, the entire disclosures of which application are hereby incorporated herein by reference.

FIELD OF THE TECHNOLOGY

At least some embodiments disclosed herein relate to memory devices, bit flipping technologies, voting scheme technologies, and more particularly, but not limited to, a system and method for providing a voting scheme in a memory page.

BACKGROUND

Computing systems and devices typically include processors and memory devices, such as memory chips or integrated circuits. The memory devices may be utilized to store data that may be accessed, modified, deleted, or replaced. The memory devices may be, for example, non-volatile memory devices that retain data irrespective of whether the memory devices are powered on or off. Such non-volatile memories may include, but are not limited to, read-only memories, solid state drives, and NAND flash memories. Additionally, the memory devices may be volatile memory devices, such as, but not limited to, dynamic and/or static random-access memories, which retain stored data while powered on, but are susceptible to data loss when powered off. In response to an input, such as from a host device, the memory device of the computing system or device may retrieve stored data associated with or corresponding to the input. In certain scenarios, the data retrieved from the memory device may include instructions, which may be executed by the processors to perform various operations and/or may include data that may be utilized as inputs for the various operations. In instances where the one or more processors perform operations based on instructions from the memory device, data resulting from the performance of the operations may be subsequently stored into the memory device for future retrieval.

In order to ensure that the requested data is accurate, memory devices may incorporate a variety of technologies such as, but not limited to, redundancy repair, error correction, and inversion bits to replace data bits in the event of failures, correct corrupted data bits, and invert data bits that may have been previously inverted or otherwise changed. For example, inversion bits may be utilized to indicated that the logic state of data stored at a particular memory cell of a memory page is inverted. When reading data from the memory device including the memory page, the memory device may correct errors associated with the data and determine, using the inversion bits, whether the data bits have been inverted. If the data bits have been inverted, a bit flipper of the memory device may be utilized to flip the bits to an original value. Incorporating such functionality into a memory device often requires the use of significant memory space and memory resources, which requires memory devices to have increased die size and memory device complexity. Despite the foregoing techniques, currently technologies may be enhanced to reduce memory resource usage, reduce die size, and provide a plurality of other benefits.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
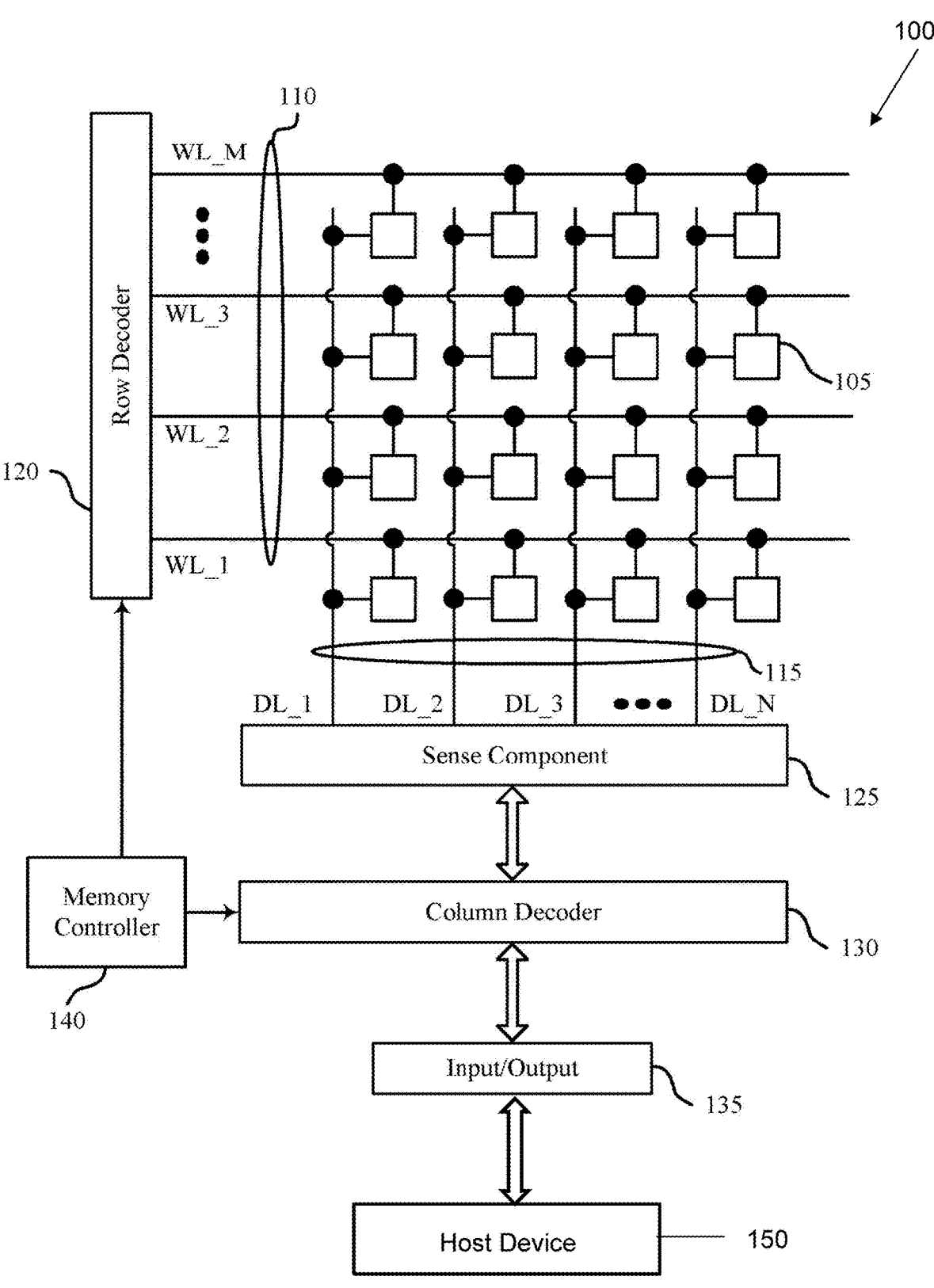
FIG. 1 illustrates an exemplary memory array of a memory device facilitating implementation and use of a voting scheme in a memory page according to embodiments of the present disclosure.

The following disclosure describes various embodiments for a memory device 100 and accompanying methods for providing voting schemes in a memory page of a memory device. In particular, embodiments disclosed herein implement a special decoding scheme for inversion bits of a memory page in order to facilitate saving of memory space on a memory die, reducing usage of memory and other resources, and more efficiently identifying whether data bits of a memory page have been inverted. When a device, such as a host device, transmit a request for data stored in a memory device, the memory device may locate the specific memory page, codeword, or other memory unit that contains the data. In certain scenarios, the data bits stored in the memory may contain errors, corrupted bits, inverted bits, or a combination thereof. Before providing the data bits in response to the host device in response to the request, it is necessary to correct any identified errors, potentially replace corrupted bits, and identify whether the data bits have been inverted. To that end, embodiments of the present disclosure are able to effectively identify errors in bits, corrupted bits, and more specifically identify inverted data bits using fewer inversion bits and memory device componentry than existing technologies. For example, embodiments of the present disclosure are able to effectively identify inverted data bits using inversion bit voting without the use of data line multiplexers when processing the inversion bits. When the voting using the inversion bits indicates that the data bits requested by the host device are inverted, the memory device 100 is configured to flip the data bits prior to providing the data bits to the host device. If, however, the voting using the inversion bits indicates that the data bits are not inverted, the memory device 100 may provide the data bits to the host device without flipping the data bits.

In certain embodiments, the present disclosure provides an enhanced voting scheme that enhances the reliability of inversion bits utilized for identifying inversion of data bits of a memory page. In certain embodiments, an inversion bit may be done per memory page of a memory device and the memory page may include multiple column addresses for which inversion bits are specified. However, such embodiments, may have data path architectures that are not as efficient as desired. In certain enhanced embodiments, inversion bits may be utilized for the row address(es) of a memory page rather than the column addresses to reduce the number of inversion bits required when voting to determine whether data bits are inverted. In certain enhanced embodiments, the inversion bits may be directly routed from sense amplifiers that receive the inversion bits from memory cells of a memory page to a voting circuit that is configured to tabulate the votes using the inversion bits. In certain embodiments, if a majority of the inversion bits indicate that the data bits are inverted, a threshold number of inversion bits indicate that the data bits are inverted, all of the inversion bits indicate that the data bits are inverted, or if any of the inversion bits indicate that the bits are inverted, the voting may indicate that the data bits are inverted and that the data a bits need to be flipped, such as via XOR circuitry or a bit flipping component, prior to providing the data bits to the host device.

In certain embodiments, a system for providing a voting scheme in a memory page is provided. In certain embodiments, the system may include a host device configured to send requests for data and receive, in response to the requests, data bits from one or more memory pages of a memory device, such as memory device 100 that may include a memory array. In certain embodiments, the system may also include a memory array comprising any number of memory cells configured to store data bits in the memory device 100. In certain embodiments, the system may include a controller communicatively linked to the memory array of the memory device 100 that may be configured to control the operation of the memory array, the memory cells, components of the memory device 100, or a combination thereof. In certain embodiments, the controller may be configured to receive a request from the host device for data stored in the memory array of the memory device. In certain embodiments, the controller may be configured to determine, such as based on a row address and a column address specified in the request, a memory page of the memory array storing the data bits corresponding to the data requested in the request. In certain embodiments, the controller may be configured to transfer data bits associated with the data from the memory page to at least one data sense amplifier configured to determine the values of the data bits (e.g., logic 0 or 1). The data bits may be provided to a multiplexer(s) to select a portion of the data bits to provide in response to the request.

In certain embodiments, the controller may also be configured to transfer an inversion bit corresponding to each row address of the memory page to a voting circuit. In certain embodiments, the number of inversion bits may be an odd number of inversion bits to ensure that a vote using the inversion bits results in a majority vote. In certain embodiments, the controller may be configured to determine, via the voting circuit, whether voting based on the inversion bits corresponding to each row address of the memory page indicates that the data bits are inverted. If the voting indicates that the data bits are inverted, the voting circuit may provide a signal indicating the voting result to bit flipping component of the memory device 100, such a XOR circuitry or other bit flipping component. The data bits may be provided to the XOR circuitry or other bit flipping circuitry from the multiplexers utilized for the data bits, and the XOR circuitry or other bit flipping circuitry may flip the values of the data bits based on the signal from the voting circuit. Once the data bits are flipped, the controller may be configured to provide the flipped data bits to the host device in response to the request. If, however, the voting indicates that the data bits are not inverted, the voting circuit may transmit a signal to the XOR circuitry or bit flipping component that the data bit values should remain the same and should not be flipped. In such a scenario, the data bits may be directly provided from the XOR circuitry or bit fit flipping component to the host device without conducting a bit flipping operation on the data bits.

In certain embodiments, the system for providing the voting scheme in a memory page may be configured to incorporate further functionality. In certain embodiments, the controller may be further configured to close the memory page after providing the flipped data bits or original data bits (i.e., unflipped data bits) to the host device. In certain embodiments, the controller may be further configured to activate the memory page after determining the memory page based on a row address and/or a column address specified in the request issued by the host device, another device, or a combination thereof. In certain embodiments, the memory page may be activated based on issuance of an activate command that opens the memory page and causes transfer of charge from capacitors of the memory device 100 to sense amplifiers of the memory device so that the data bit values of the data bits stored in the memory cells of the page may be determined. In certain embodiments, the controller may be further configured to transfer the data bits from the at least one data sense amplifier to a multiplexer configured to select a portion of the data bits for providing in response to the request by the host device, other device, or a combination thereof.

In certain embodiments, the controller may be further configured to transfer the data bits from the multiplexer to XOR logic circuitry to flip the data bits. In certain embodiments, the controller may be further configured to transfer the inversion bit for each row address from the memory page to a corresponding inversion sense amplifier prior to transferring the inversion bit for each row address to the voting circuit. In certain embodiments, the controller may be further configured to determine, via the voting circuit, that the voting indicates that the data bits are inverted based on a majority of inversion bits transferred to the voting circuit indicating that the data bits are inverted. In certain embodiments, other numbers of inversion bits may dictate whether the data bits are inverted. In certain embodiments, the controller may be further configured to provide the inversion bit for each row address to the voting circuit without transferring the inversion bit for each row address to a multiplexer. In certain embodiments, the controller may be further configured to repair the data bits using redundant bits prior to flipping the data bits. In certain embodiments, the controller may be further configured to determine whether the data bits have been corrupted by utilizing at least one error correction bit. In certain embodiments, the controller may be further configured to provide the flipped data bits to a global data line prior to providing the flipped data bits (or unflipped bits if the data bits are not inverted) to the host device.

In certain embodiments, a method for providing a voting scheme in a memory page is provided. In certain embodiments, the method may include receiving, at a memory device, a request from a host device for data stored in a memory array of the memory device. Additionally, the method may include identifying, in response to the request, a memory page of the memory array storing the data. In certain embodiments, the method may include transferring an inversion bit for each row address of the memory page to a voting circuit. In certain embodiments, the method may include determining, via the voting circuit, that voting based on the inversion bit for each row address of the memory page indicates that data bits of the memory page are not inverted. In certain embodiments, the method may include providing the data bits to the host device without flipping the data bits based on the voting indicating that the data bits of the memory page are not inverted. In certain embodiments, the method may include determining that the voting based on the inversion bit for each row address of the memory page indicates that the data bits of the memory page are inverted. In certain embodiments, the method may include flipping the data bits prior to providing the data bits based on the voting indicating that the data bits of the memory page are inverted. In certain embodiments, the method may include directly routing the inversion bit for each row address of the memory page to the voting circuit without passing each inversion bit to a multiplexer. In certain embodiments, the method may include setting the inversion bit for each row address of the memory page.

In certain embodiments, a memory device for providing a voting scheme in a memory page is provided. In certain embodiments, the memory device may include a controller configured to set inversion bit for a row address of a memory page. In certain embodiments, the memory device may determine, based on a request for data, that the memory page of the memory device stores data bits corresponding to the data. In certain embodiments, the controller may be configured to transfer, to a voting circuit, the inversion bits for the row address of the memory page. In certain embodiments, the memory device may be configured to conduct, via the voting circuit, a vote using the inversion bits to determine whether the data bits are inverted. In certain embodiments, the vote may indicate whether the data bits of the memory page are inverted based on a threshold number of inversion bits indicating that the data bits are inverted. In certain embodiments, in response to a determination that the vote indicates that the data bits are inverted, the memory device may be configured to flip the data bits to generate flipped data bits then and provide the flipped data bits to a host device or other device in response to the request. If, however, the vote indicates that that the data bits are not inverted, the memory device may be configured to provide the data bits in their current state to the host device or other device in response to the request. In certain embodiments, the controller of the memory device may be further configured to perform error correction, redundancy repair, or a combination thereof, prior to flipping the data bits to generate the flipped data bits.

Based on the foregoing and the remaining description, the embodiments of the memory device 100 and methods described herein are able to effectively identify whether data bits are inverted by utilizing a less memory intensive voting scheme using inversion bits. Furthermore, in certain embodiments, the functionality provided by the embodiments may also require less physical chip space to support the functionality, fewer memory and other computing resources, and lower costs of adding inversion bits to memory pages of memory devices 100.

As shown in FIG. 1 and referring also to FIGS. 2-10, a memory device 100 and accompanying methods 700, 1000 for providing a voting scheme in a memory page is provided. FIG. 1 illustrates an exemplary memory array of a memory device facilitating implementation and use of a voting scheme in a memory page according to embodiments of the present disclosure. In certain embodiments, the memory array of the memory device may be configured to support an enhanced voting and bit flipping scheme. In certain embodiments, the memory array of the memory device 100 may be used to store data (e.g., binary information, such as a logic 0 or logic 1). In certain embodiments, the memory array may include memory cells 105 that are programmable to store different states. In certain embodiments, each memory cell 105 may be programmable to store two states, denoted as a logic 0 and a logic 1. In some cases, memory cell 105 may be configured to store more than two logic states. In certain embodiments, a memory cell 105 may include a memory element having programmable states. For example, a memory cell 105 in certain memory architectures may store a charge representative of the programmable states in a capacitor; for example, a charged and uncharged capacitor may represent two logic states, respectively. In certain embodiments, certain memory architectures may commonly use such a design and may use a capacitor including a dielectric material and having linear electric polarization properties as a memory element. Certain memory architectures may also use such a design, but the capacitor used as the memory element may include a ferroelectric material with non-linear polarization properties. In certain embodiments, a memory cell 105 in a PCM or segregation based memory (SBM) architecture may change a resistivity (e.g., resistance or threshold voltage) of a material where different resistivity may represent different logic states.

In certain embodiments, operations such as, but not limited to, reading, writing, and/or other operations, may be performed on memory cells 105 by activating or selecting the appropriate access line 110 and digit line 115. In certain embodiments, access lines 110 may also be referred to as word lines 110 and digit lines 115 may also be referred to as bit lines 115. In certain embodiments, activating or selecting a word line 110 or a digit line 115 may include applying a voltage to the respective line. In certain embodiments, the activating or selecting may be performed in response to receipt of an activation command by the memory device 100, such as a command issued by the host device 150. In certain embodiments, word lines 110 and digit lines 115 may be made of conductive materials. For example, word lines 110 and digit lines 115 may be made of metals (such as copper, aluminum, gold, tungsten, etc.), metal alloys, other conductive materials, other materials, or a combination thereof. In FIG. 1, for example, each row of memory cells 105 may be connected to a single word line 110, and each column of memory cells 105 may be connected to a single digit line 115. By activating one word line 110 and one digit line 115 (e.g., applying a voltage to the word line 110 or digit line 115), a single memory cell 105 may be accessed at their intersection. In certain embodiments, accessing the memory cell 105 may include reading or writing the memory cell 105. In certain embodiments, the intersection of a word line 110 and digit line 115 may be referred to as an address of a memory cell.

In certain architectures, the logic storing device of a cell (e.g., a capacitor) may be electrically isolated from the digit line 115 by a selection component. In certain embodiments, the word line 110 may be connected to and may control the selection component. For example, the selection component may be a transistor and the word line 110 may be connected to the gate of the transistor. In certain embodiments, activating the word line 110 may result in an electrical connection or closed circuit between the capacitor of a memory cell 105 and its corresponding digit line 115. The digit line may then be accessed to either read from or write to the memory cell 105. In certain embodiments, accessing memory cells 105 may be controlled through a row decoder 120 and a column decoder 130. In certain embodiments, a row decoder 120 may receive a row address from the memory controller 140 and may activate the appropriate word line 110 based on the received row address. Similarly, a column decoder 130 may be configured to receive a column address from the memory controller 140 and may activate the appropriate digit line 115. For example, memory array of the memory device 100 may include multiple word lines 110, labeled WL_1 through WL_M, and multiple digit lines 115, labeled DL_1 through DL_N, where N and N may depend on the array size. As a result, by activating a word line 110 and a digit line 115, e.g., WL_3 and DL__N, the memory cell 105 at their intersection may be accessed.

In certain embodiments, upon accessing a memory cell 105, the memory cell 105 may be read, or sensed, by sense component 125 (e.g., a sense amplifier) to determine the stored state of the memory cell 105. For example, after accessing the memory cell 105, the capacitor of memory cell 105 may discharge onto its corresponding digit line 115. In certain embodiments, discharging the capacitor may be based on biasing, or applying a voltage, to the capacitor. The discharging may induce a change in the voltage of the digit line 115, which sense component 125 may compare to a reference voltage in order to determine the stored state of the memory cell 105. For example, if digit line 115 has a higher voltage than the reference voltage, then the sense component 125 may determine that the stored state in memory cell 105 was a logic 1 and vice versa. In certain embodiments, the reliability of a sensing operation may be dependent on a sensing window that results from reading the memory cell 105. For instance, a larger sensing window may be associated with fewer bit errors than a smaller sensing window. In certain embodiments, the sensing window may be determined as the difference between a voltage of a digit line 115 resulting from reading a memory cell 105 when storing a logic 1 and the voltage of the digit line 115 resulting from reading the memory cell when storing a logic 0. In certain embodiments, sense component 125 may include various transistors or amplifiers in order to detect and amplify a difference in the signals, which may be referred to as latching. In certain embodiments, the detected logic state of memory cell 105 may then be output through column decoder 130 as output 135, which may be provided to a host device 150 that may have requested the data from the memory device 100.

In certain embodiments, a memory cell 105 may be set, or written, by activating the relevant word line 110 and digit line 115. In certain embodiments, activating a word line 110 may electrically connect the corresponding row of memory cells 105 to their respective digit lines 115. By controlling the relevant digit line 115 while the word line 110 is activated, a memory cell 105 may be written—e.g., a logic value may be stored in the memory cell 105. Column decoder 130 may accept data, for example input 135, to be written to the memory cells 105. In certain embodiments, the memory controller 140 may control the operation (e.g., read, write, re-write, refresh, etc.) of memory cells 105 through the various components, such as row decoder 120, column decoder 130, sense component 125, and/or other components of the memory device 100. In certain embodiments, the memory controller 140 may generate row and column address signals in order to activate the desired word line 110 and digit line 115. In certain embodiments, memory controller 140 may also generate and control various voltage potentials used during the operation of memory array 100. In certain embodiments, the amplitude, shape, or duration of an applied voltage discussed herein may be adjusted or varied and may be different for the various operations for operating memory array 100. In certain embodiments, one, multiple, or all memory cells 105 within the memory array of the memory device 100 may be accessed simultaneously. For example, multiple or all cells of memory array 100 may be accessed simultaneously during a reset operation in which all memory cells 105, or a group of memory cells 105, are set to a single logic state.

In certain embodiments, the memory array of the memory device 100 may flip a logic state of a memory cell 105 (e.g., change a logic value stored in memory cell 105 from one value (e.g., logic 1) to another logic value (e.g., logic 0). In certain embodiments, the memory device 100 may perform the flipping internally and may not notify other external devices or components that the logic state of a memory cell has been flipped. In certain embodiments, the memory device 100 may flip memory cells to save power, to increase the reliability of a device, to reduce imprinting, and to provide other benefits. For example, ferroelectric memory cells may be flipped to mitigate the effects of imprinting—e.g., the drifting of ferroelectric domains due to extended exposure to or storage of the same charge, which may reduce the reliability of the memory cell over time. In certain embodiments, a memory cell 105 storing a logic state that is different than the original logic state (e.g., the logic state expected to be stored at the memory cell by external devices or components, such as host device 150 in certain embodiments) may be referred to as being in an inverted state. In certain embodiments, the memory array of the memory device 100 may be partitioned into sets of memory cells. For example, the memory array of the memory device 100 may be partitioned into memory sections, which may include thousands or any number of memory cells 105. In certain embodiments, a memory section may be further partitioned into codewords, which may include hundreds or any other number of memory cells 105. In certain embodiments, a codeword may be partitioned into memory units which may include a single-digit number of memory cells 105 (e.g., a memory unit may include four memory cells 105 or other number of memory cells 105).

In certain embodiments, data (e.g., information) stored in the memory array of memory device 100 may be requested by another device (e.g., a memory component such as a buffer or an external processor or the host device 150). In certain embodiments, the memory array of the memory device 100 may identify a location of the information within the memory array of the memory device 100. In certain embodiments, the memory array of the memory device 100 may determine that the requested information is located within a codeword that is located within a particular section of memory. In certain embodiments, the memory array of the memory device 100 may access the entire memory section based on identifying that the memory section includes the codeword and may provide all of the information stored in the memory section to the requesting device. In certain embodiments, however, before providing the information stored in the memory section to the requesting device, the memory array of the memory device 100 may first process the information and perform redundancy repair and error correction for the information bits (e.g., data bits) stored in the memory section. In certain embodiments, the memory device 100 may also determine whether any of the codewords in the memory section are in an inverted state and flip the bits of the codeword to return the data bits to the stored state expected by the requesting device.

In certain embodiments, such as during error correction, memory device 100 may generate syndrome bits which may be used to indicate whether certain memory cells are storing corrupted data and the data stored in corrupted memory cells may be flipped to the correct value. In certain embodiments, no errors may be identified during error correction and all of the generated syndrome bits may have a logic value 0. In certain embodiments, the delivery of the syndrome bits throughout a memory section may be associated with a propagation delay (e.g., due to the physical size of the memory section and/or serial data delivery). In certain embodiments, to flip the bits of the codeword, an inversion/flip bit for the codeword may be provided to a bit flipping component, which may flip the data bits of the codeword (e.g., if the inversion bit indicates that the data bits are in an inverted state). In certain embodiments, the inversion bit may be the same as or used to generate a flip bit. In certain embodiments, the memory device 100 may perform error correction for an entire codeword including a corresponding inversion bit. In certain embodiments, the memory device 100 may wait to provide a flip bit to a bit flipping component until after the syndrome bits have been received. However, in certain embodiments, waiting to send the flip bit until after receiving the syndrome bits may increase the latency of the memory system. In certain scenarios, the latency may be further increased while the flip bits are provided are delivered throughout the memory section (e.g., since the information stored in a memory section may not be provided to the requesting device until after the entire section has been completely processed).

In certain embodiments, the memory device 100 may refrain from performing error correction on an inversion bit for a codeword and may provide a flip bit to a bit flipping component concurrent with (i.e., at least partially overlapping with) the error correction. In certain embodiments, memory device 100 may include multiple inversion bits in a codeword and may generate a flip bit based on a value stored by the inversion bits. In certain embodiments, the memory device 100 may also perform an error correction of data bits of the codeword using one error correction technique (e.g., using a Hamming code) concurrently with an error correction/generation of the flip bit using a different error correction technique (e.g., using a repetition code). In certain embodiments, the generation and/or error correction of the flip bit may overlap with the generation or distribution of syndrome bits (e.g., the transmission of all of the syndrome bits to different locations of a memory section) during the error correction of the data bits. In certain embodiments, after error correcting and/or generating the flip bit, the memory device 100 may communicate (e.g., transmit, send, provide, etc.) the flip bit to a bit flipping component where the data bits may be flipped based on a value of the flip bit. As a result, latency may be reduced, and the effect of aggregate propagation delays may be mitigated for the memory device 100.

In certain embodiments, memory device 100 may generate and/or error correct the flip bit using a voting scheme and multiple inversion bits. In certain embodiments, a voting scheme may be a type of error correction scheme. For example, memory device 100 may determine for a codeword including multiple inversion bits whether a majority of the inversion bits indicates that data bits in the codeword are in an inverted state. In certain embodiments, memory device 100 may generate a flip bit based on determining whether at least some of (e.g., a majority, all of, or a set number) the data bits indicate that the codeword is in an inverted state (e.g., memory array 100 may generate a flip bit indicating that the data bits are to be flipped if a majority of the data bits indicate that the codeword is in an inverted state). In certain embodiments, memory device 100 may then transmit the flip bit to a bit flipping component. In certain embodiments, a reliability of the flip bit may be increased using a different error correction scheme for the inversion bits than for the data bits of a codeword. In certain embodiments, the flip bit output by the voting scheme may be generated and/or provided to a bit flipping component concurrently with the generation and/or distributing of the syndrome bits during the error correction of the data bits for the codeword.

In certain embodiments, the memory device 100 may store two inversion bits (or other number) for a codeword using a differential sensing scheme to generate the flip bit for the codeword. In certain embodiments, the differential sensing scheme may be used to generate a single inversion bit that has a higher reliability than the individual inversion bits and the corrected information bits in memory device 100. In certain embodiments, the single inversion bit may then be used as or used to generate the flip bit. In certain embodiments, the scheme may increase the reliability of the flip bit without error correcting the inversion and/or flip bits and may be used to provide the flip bit to a bit flipping component concurrently with the generation and/or distribution of syndrome bits. In certain embodiments, memory device 100 may store a single inversion bit for a codeword in a memory cell having a larger sensing window than other memory cells in memory array 100. For example, the inversion bit may be stored in a memory cell having a larger size than other memory cells in memory device 100 that uses a different technology than other memory cells in the memory array, etc. In certain embodiments, the single inversion bit may have a higher reliability than the corrected information bits in memory device 100 and may be used as or used to generate the flip bit. In certain embodiments, the scheme may increase the reliability of the flip bit without error correcting the inversion/flip bit and may provide the flip bit to a bit flipping component concurrently with the generation and/or distribution of syndrome bits.

Figure 2:
FIG. 2 illustrates an exemplary read component of a memory device facilitating implementation and use of a voting scheme in a memory page according to embodiments of the present disclosure.
Figure 2:
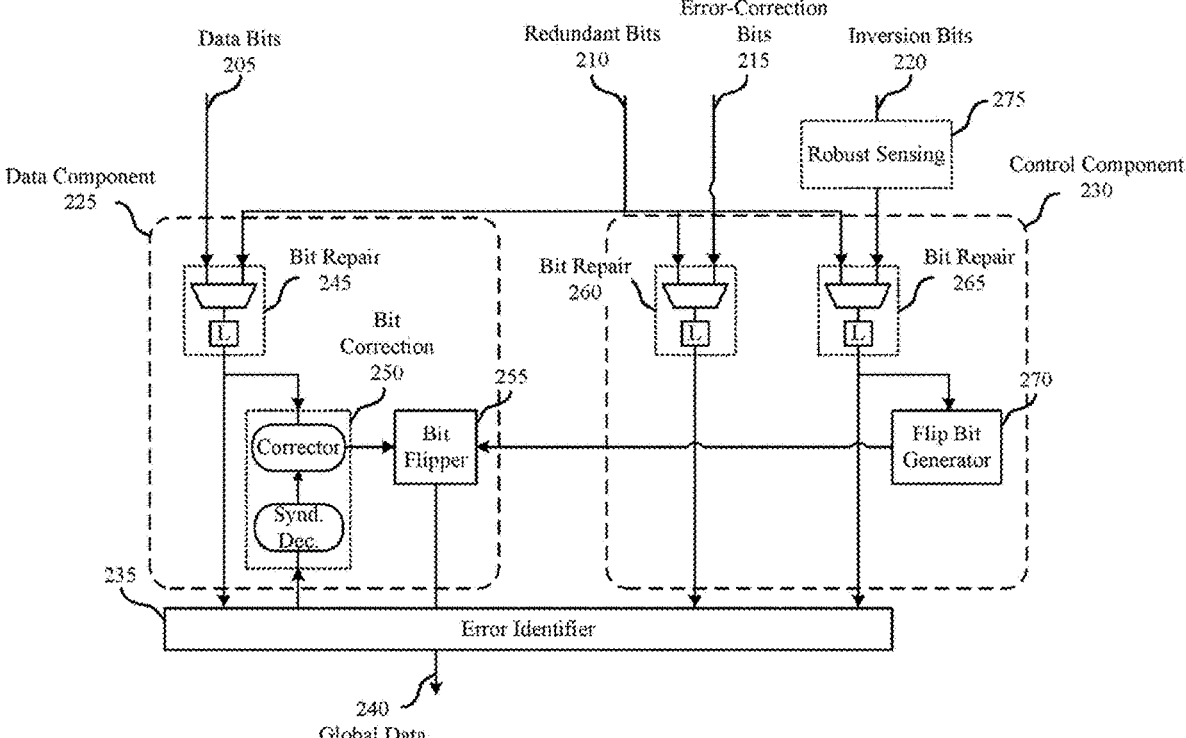

Referring now also to FIG. 2, an exemplary read component of a memory device 100 facilitating implementation and use of a voting scheme in a memory page according to embodiments of the present disclosure is illustrated. In certain embodiments, the read component may be config-ured an enhanced bit flipping scheme in accordance with various aspects of the present disclosure. In certain embodiments, read component 200 may be used to process information stored in a memory array of a memory device 100. In certain embodiments, read component 200 may include input lines (e.g., data bit line 205, redundant bit line 210, error correction bit line 215, and inversion bit line 220), data component 225, control component 230, error identification component 235, an output line (global data line 240), and robust sensing component 275. In certain embodiments, data bit line 205 may be configured to communicate data bits for one or more codewords (or other memory units) between memory cells storing data and data component 225. In certain embodiments, data bits may represent data that may be utilized for a user application. In certain embodiments, the redundant bit line 210 may be used to communicate redundant bits between memory cells storing redundant data bits and data component 225 and between memory cells storing redundant data control bits and control component 230. In certain embodiments, redundant bits may correspond to and be used to replace certain data and/or control bits. In certain embodiments, redundant bits may be stored in memory cells having higher reliability than other memory cells.

In certain embodiments, error correction bit line 215 may be used to communicate error correction bits, such as parity bits, between memory cells 105 storing error correction bits and control component 230. In certain embodiments, error correction bits may be used to identify errors in data and/or control bits. In certain embodiments, inversion bit line 220 may be used to communicate inversion bits indicating whether the data bits are in an inverted state between memory cells storing inversion bits and control component 230. In certain embodiments, inversion bits for a codeword (or other memory unit) may be used to indicate whether corresponding data and/or control bits for a codeword (or other memory unit) are in an original and/or expected state or an inverted state. In certain embodiments, data component 225 may be configured to process data bits stored in one or more codewords (or other memory unit) and to deliver processed data bits to a requesting device, such as host device 150. In certain embodiments, data component 225 may receive data bits from data bit line 205. In certain embodiments, data component 225 may include first bit repair component 245, bit correction component 250, and bit flipping component 255. In certain embodiments, first bit repair component 245 may be configured to replace particular data bits with corresponding redundant data bits. In certain embodiments, first bit repair component 245 may receive data bits from data bit line 205 and redundant data bits from redundant bit line 210. In certain embodiments, first bit repair component 245 may replace particular data bits of the received data bits with particular redundant data bits of the received redundant bits during a process that may be referred to as redundancy repair. In certain embodiments, first bit repair component 245 may include a first multiplexer configured to replace a subset of data bits and a latch for storing the redundancy repaired data bits. In certain embodiments, an output of the first multiplexer may be coupled with bit correction component 250 and/or error identification component 235. In certain embodiments, first bit repair component 245 may transmit the redundancy repaired data bits to bit correction component 250 and/or error identification component 235.

In certain embodiments, bit correction component 250 may be configured to correct data bits that have been identified as being corrupted. In certain embodiments, bit correction component 250 may include a component for correcting corrupted bits and a component for processing syndrome bits, such as a syndrome decoder. In certain embodiments, bit correction component 250 may receive data bits (e.g., redundancy repaired data bits) from first bit repair component 245. In certain embodiments, bit correction component 250 may also receive syndrome bits from error identification component 235. In certain embodiments, the syndrome bits may identify data bits of the redundancy repaired data bits that have failed (e.g., been corrupted). In certain embodiments, bit correction component 250 may then correct the errors in the data bits identified by the syndrome bits. In certain embodiments, bit correction component 250 may be configured to identify particular data bits that have been identified as failed (e.g., corrupted) based on the syndrome bits and flips a logic value of the data bit (e.g., using XOR circuitry). In certain embodiments, bit correction component 250 may determine that none of the data bits are corrupted based on the syndrome bits (e.g., when the syndrome bits are all logic Os). In certain embodiments, after processing the syndrome bits, bit correction component 250 may transmit the corrected data bits to bit flipping component 255.

In certain embodiments, bit flipping component 255 may be configured to flip the corrected data bits from an inverted state to an original state based on a received flip bit. In certain embodiments, bit flipping component 255 may receive the corrected data bits from bit correction component 250. In certain embodiments, bit flipping component 255 may also receive a flip bit from flip bit generator 270. In certain embodiments, bit flipping component 255 may flip the corrected data bits from an inverted state based on a value of the flip bit. F or example, if a value of the flip bit is a logic 1, the bit flipping component 255 may flip the corrected data bits. In certain embodiments, flipping the corrected data bits may include transmitting the corrected data bits through an XOR component that causes a value of the data bits to change to an opposite value (e.g., from a logic 0 to a logic 1). In certain embodiments, if the data bits stored in the memory cells were flipped (e.g., placed in an inverted state for reliability reasons) before being provided to data component 225, then bit flipping component 255 may flip the corrected data bits based on receiving a flip bit that triggers bit flipping component 255 to flip the corrected data bits. In certain embodiments, if the data bits stored in the memory cells were not flipped before being provided to data component 225, then bit flipping component 255 may refrain from flipping the corrected data bits based on receiving a flip bit that does not trigger bit flipping component 255 to flip the corrected data bits. In certain embodiments, bit flipping component 255 may be configured to flip the data bits after errors in the data bits have been corrected. In certain embodiments, bit flipping component 255 may improperly flip or fail to flip corrected data bits if the flip bit is corrupted. In certain embodiments, bit flipping component 255 may generate global data bits, which may be used to refer to data bits that have been fully by processed by read component 200 and that are provided to a requesting device. In certain embodiments, the bit flipping component 255 may transmit the global data bits to a requesting device via global data line 240.

In certain embodiments, control component 230 may be configured to process control bits stored in one or more codewords (or other memory unit) and to assist data component 225 in the processing of data bits for one or more codewords. In certain embodiments, control component 230 may include second bit repair component 260, third bit repair component 265, and flip bit generator 270. In certain embodiments, second bit repair component 260 may be configured to replace particular error correction bits with corresponding redundant error correction bits similar to first bit repair component 245. In certain embodiments, second bit repair component 260 may receive error correction bits from error correction bit line 215 and redundant error correction bits from redundant bit line 210. In certain embodiments, second bit repair component 260 may not receive any redundant error correction bits on redundant bit line 210. In certain embodiments, second bit repair component 260 may include a second multiplexer configured to replace a subset of the error correction bits and a latch for storing the redundancy repaired error correction bits. In certain embodiments, second bit repair component 260 may transmit the redundancy repaired error correction bits to error identification component 235.

In certain embodiments, third bit repair component 265 may be configured to replace certain inversion bit(s) with corresponding redundant inversion bits similar to first bit repair component 245 and second bit repair component 260. In certain embodiments, third bit repair component 265 may receive inversion bit(s) from inversion bit line 220 and redundant inversion bit(s) from redundant bit line 210. In certain embodiments, third bit repair component 265 may not receive any redundant inversion bits on redundant bit line 210. In certain embodiments, third bit repair component 265 may include a third multiplexer configured to replace a subset of the inversion bit(s) and a latch for storing the redundancy repaired inversion bit(s). In certain embodiments, the bit repair component 265 may transmit the redundancy repaired inversion bit(s) to error identification component 235. In certain embodiments, third bit repair component 265 may be configured to receive multiple inversion bits via inversion bit line 220 and transmit multiple redundancy repaired inversion bits to flip bit generator 270. In certain embodiments, the second and third multiplexers may be implemented as a single multiplexer configured to replace a subset of the control bits.

In certain embodiments, flip bit generator 270 may be configured to determine whether the data bits are in an inverted state and to generate a flip bit for a codeword (or other memory unit) indicating whether data bits of the codeword (or other memory unit) should be flipped from an inverted state back to an original and/or expected state before being provided to a requesting device. In certain embodiments, flip bit generator 270 may generate the flip bit based on the redundancy repaired inversion bit(s) received from bit repair component 265. In certain embodiments, flip bit generator 270 may implement an alternative error correction technique (e.g., using a repetition code, such as a voting scheme) different than the error correction technique implemented by error identification component 235. In certain embodiments, for example, when multiple inversion bits are used for a codeword (or other memory unit), flip bit generator 270 may include a voting component, which may be used to determine whether at least some of (e.g., a majority or all of) the inversion bits indicate that the corresponding data bits in the codeword (or other memory unit) are in an inverted state or, on the other hand, the inversion bits indicate that the corresponding data bits in the codeword (or other memory unit) are not in an inverted state. In certain embodiments, for example, if the majority of the inversion bits indicate that the corresponding data bits are in an inverted state, flip bit generator 270 may generate a flip bit that triggers bit flipping component 255 to flip the corrected data bits. Otherwise, in certain embodiments, if the majority of the inversion bits indicate that the corresponding data bits are not in an inverted state (e.g., are in a non-inverted, originally stored state), flip bit generator 270 may generate a flip bit that directs bit flipping component 255 to refrain from flipping the corrected data bits. In certain embodiments, the voting component may determine whether a majority of inversion bits indicate that corresponding data bits are in an inverted state concurrent with the identification of errors in the data bits by error identification component 235. In certain embodiments, the voting component may be electrically isolated from error identification component 235. The voting component is discussed in more detail with reference to FIG. 4.

In certain embodiments, when multiple inversion bits are used for a codeword (or other memory unit), robust sensing component 275 may be used to generate a single, high reliability inversion/flip bit from multiple inversion bits of a codeword before the codeword is processed using data component 225 or control component 230 and without employing error correction techniques for the inversion bits. For example, robust sensing component 275 may be a differential sensing component. In certain embodiments, for example, two inversion bits of a codeword stored in two memory cells may be sensed together using robust sensing component 275 to generate a single high-reliability inversion bit (e.g., an inversion bit having a raw bit error rate that is greater than or equal to an uncorrectable error rate of information bits in the memory system). In certain embodiments, the high reliability inversion bit may then be provided to third bit repair component 265. In certain embodiments, when robust sensing component 275 is used, flip bit generator 270 may include a switch or a wire that routes the high reliability inversion bit to bit flipping component 255 (e.g., the generated high reliability inversion bit may be used as the flip bit). In certain embodiments, when a single inversion bit is used for a codeword, a more robust memory cell 105 may be used to generate a single, high reliability inversion/flip bit before the codeword is processed using data component 225 or control component 230 and without employing error correction techniques for the inversion bit. In certain embodiments, the single inversion bit is stored in a robust memory cell having a lower likelihood of producing erroneous data (e.g., a raw bit error rate <=1e-18) than other memory cells in a memory array. For example, the memory cell may be constructed to have a larger sensing window than other memory cells, may use a different memory technology (e.g., DRAM instead of FeRAM), and the like. In certain embodiments, when a single memory cell (e.g., a robust memory cell) is used to store an inversion bit for a codeword, the flip bit and the inversion bit may be the same and flip bit generator 270 may include a switch or a wire that routes the inversion bit and/or flip bit to bit flipping component 255 (e.g., the inversion bit may be used as the flip bit in some cases).

In certain embodiments, the flip bit generator 270 may transmit a generated flip bit to bit flipping component 255. In certain embodiments, the flip bit may be transmitted to bit flipping component 255 while error identification component 235 generates and/or transmits syndrome bits (e.g., bit flipping component 255 may transmit the flip bit to the bit flipping component 255 before or while the syndrome bits are transmitted to bit correction component 250). In certain embodiments, flip bit generator 270 may be electronically isolated from error identification component 235 via bit flipping component 255. That is, an output of error identification component 235 may not affect an output of flip bit generator 270 or the generation of the flip bit may be performed independently of, or without reference to, the generation of the syndrome bits. In certain embodiments, error identification component 235 may be configured to identify errors in data bits received from first bit repair component 245. In certain embodiments, error identification component 235 may identify errors in the data bits based on error correction bits received from bit repair component 260 (e.g., using a Hamming code). In certain embodiments, error identification component 235 may generate syndrome bits based on the data and error correction bits and may transmit the syndrome bits to bit correction component 250. In certain embodiments, error identification component 235 may transmit the syndrome bits to bit correction component 250 in a serial or parallel fashion. In certain embodiments, providing the syndrome bits for an entire memory section to bit correction component 250 may be associated with propagation delays.

In certain embodiments, global data line 240 may be configured to transmit data bits that have been processed through read component 200 ("global data bits") to a requesting device, such as host device 150. In certain embodiments, first bit repair component 245, bit correction component 250, bit flipping component 255, second bit repair component 260, bit repair component 265, and flip bit generator 270 may each be implemented as a single component for an entire memory section. In certain embodiments, first bit repair component 245, bit correction component 250, bit flipping component 255, second bit repair component 260, bit repair component 265, and flip bit generator 270 may each be implemented as multiple component for each codeword of an entire memory section. In certain embodiments, read component 200 including multiple memory sections may include one or more first bit repair components 245, one or more bit correction components 250, one or more bit flipping components 255, one or more second bit repair components 260, one or more bit repair components 265, one or more flip bit generators 270, and/or any number of other componentry.

Figure 3:
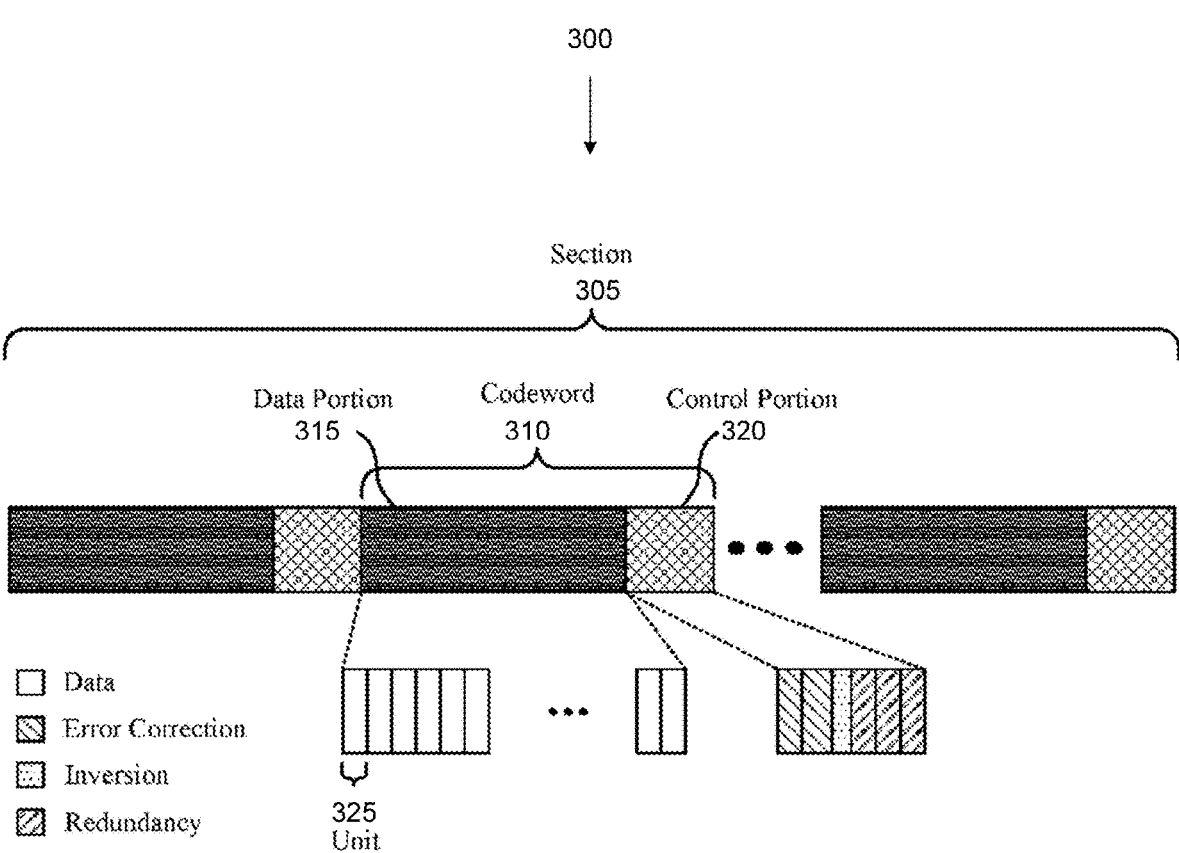
FIG. 3 illustrates an exemplary memory configuration for use with the memory array of FIG. 1 according to embodiments of the present disclosure.

Referring now also to FIG. 3, an exemplary memory configuration 300 for use with the memory array of memory device 100 and/or other devices according to embodiments of the present disclosure. In certain embodiments, memory configuration 300 may be used to store digital information. In certain embodiments, memory configuration 300 may include memory sections, such as memory section 305, codewords, such as codeword 310, and memory units, such as memory unit 325. In certain embodiments, memory section 305 may encompass information stored in hundreds or thousands (or other number) of memory cells. In certain embodiments, the memory cells may span across large physical distances (e.g., ~1 mm). In certain embodiments, memory section 305 may correspond to a page of memory (e.g., 1024 bits) and may include multiple codewords (e.g., 8 codewords), including codeword 310. In certain embodiments, codeword 310 may encompass hundreds (or other number) of memory cells. In certain embodiments, codeword 310 corresponds to a pre-fetch size (e.g., 128 bits) and includes data portion 315 and control portion 320. In certain embodiments, data portion 315 may store data bits, such as application data. In certain embodiments, control portion 320 may store control bits, such as redundant bits, error correction bits, inversion bits, and/or other types of bits. In certain embodiments, the control bits may be used to facilitate the processing and to increase the reliability of the data bits stored in data portion 315. In certain embodiments, data portion 315 and control portion 320 may be further partitioned into memory units. In certain embodiments, memory units, such as memory unit 325, may encompass a few memory cells (e.g., 2, 4, 8, or other number). In some cases, memory unit 325 may correspond to a number of bits. In certain embodiments, some or all of memory section 305 may be accessed when data stored in codeword 310 is requested by another device. In certain embodiments, accessing all of memory section 305 may result in propagation delays during memory operations (e.g., due to the large physical distance of the memory cell in memory section 305). As discussed in the present disclosure, these propagation delays may be compounded when processing steps of an operation are performed serially, and to reduce propagation delays, a memory device and/or system may perform certain steps, such as flip bit generation and error correction of data bit for a codeword, in parallel. In certain embodiments, as also discussed herein, to increase the reliability of a generated flip bit using an alternative error correction technique, the memory system and/or memory device 100 may utilize multiple inversion bits per codeword. In certain embodiments, the multiple inversion bits may be stored in control portion 320. For example, three inversion bits may be stored in control portion 320 along with nine error correction bits and twelve redundant bits. In another example, two inversion bits may be stored in control portion 320 along with nine error correction bits, twelve redundant bits, and one unused bit.

Figure 4:
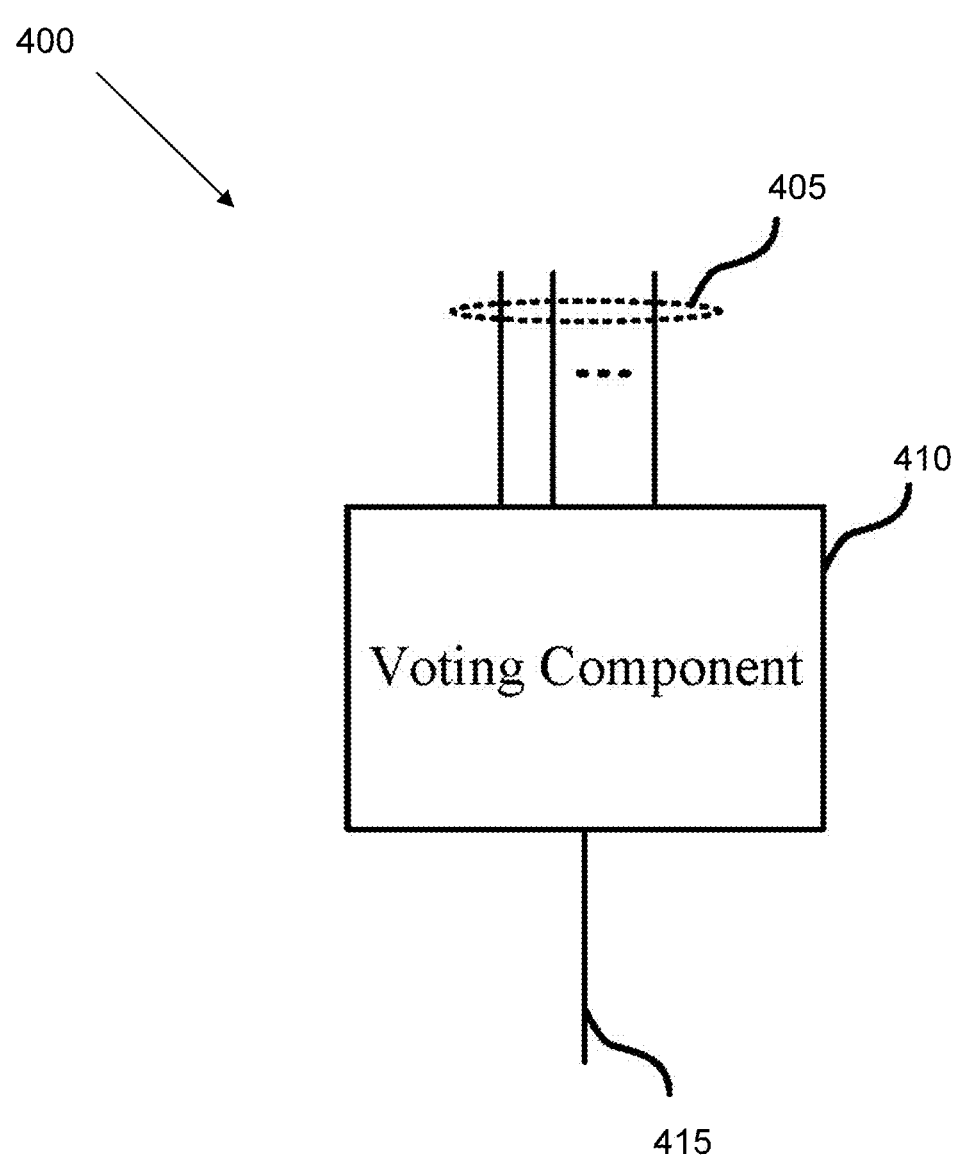
FIG. 4 illustrates an exemplary voting component for use with the memory array of FIG. 1 according to embodiments of the present disclosure.

Referring now also to FIG. 4, an exemplary voting component 400 for use with the memory array of memory device 100 according to embodiments of the present disclosure is shown. In certain embodiments, the voting component 400 may include a flip bit generator for an enhanced bit flipping scheme in accordance with embodiments of the present disclosure. In certain embodiments, bit generator 400 may be used to generate a flip bit based on multiple inversion bits and may be an example of flip bit generator 270 of FIG. 2. In certain embodiments, flip bit generator 400 may include input lines 405, voting component 410, and output line 415. In certain embodiments, the input lines 405 may be used to communicate the values of multiple inversion bits of a codeword (or other memory unit) to voting component 410. In certain embodiments, input lines 405 may be conductive traces or a wireless communication path. In certain embodiments, input lines 405 may include three or more input lines. In certain embodiments, input lines 405 may be a single input line and may deliver multiple inversion bits to voting component 410 in a serial fashion. In certain embodiments, voting component 410 may be used to implement an error-correction scheme and to determine whether at least some of (e.g., a majority of or all of) the inversion bits indicate that the data bits of the codeword (or other memory unit) are in an inverted or an original state. In certain embodiments, voting component 410 may also increase the reliability of a flip bit as a function of the number of inversion bits. For example, for three inversion bits, the reliability of the flip bit may be 3-choose-2 times (raw bit error rate)$^2$, for four inversion bits, the reliability of the flip bit may be 4-choose-3 times (raw bit error rate)$^3$, and for five inversion bits, the reliability of the flip bit may be 6-choose-3 times (raw big error rate)$^3$. In certain embodiments, voting component 410 may identify that two of three inversion bits indicate that the data bits of the codeword (or other memory unit) ae in an inverted state (e.g., based on a value of each of the two inversion bits being a logic 1), and may generate a flip bit that triggers a bit flipping component to flip the data bits (e.g., voting component 410 may determine that the data bits are in an inverted state). In certain embodiments, voting component 410 may identify that one of three inversion bits indicate that the data bits of the codeword are in an inverted state and may generate a flip bit that does not trigger a bit flipping component to flip the data bits (e.g., voting component 410 may determine that the data bits are in an original state). In certain embodiments, output line 415 may be used to communicate the generated flip bit to a bit flipping component, such as bit flipping component 255 as discussed with reference to FIG. 2. In certain embodiments, output line 415 may be a conductive trace or a wireless communication path.

Figure 5:
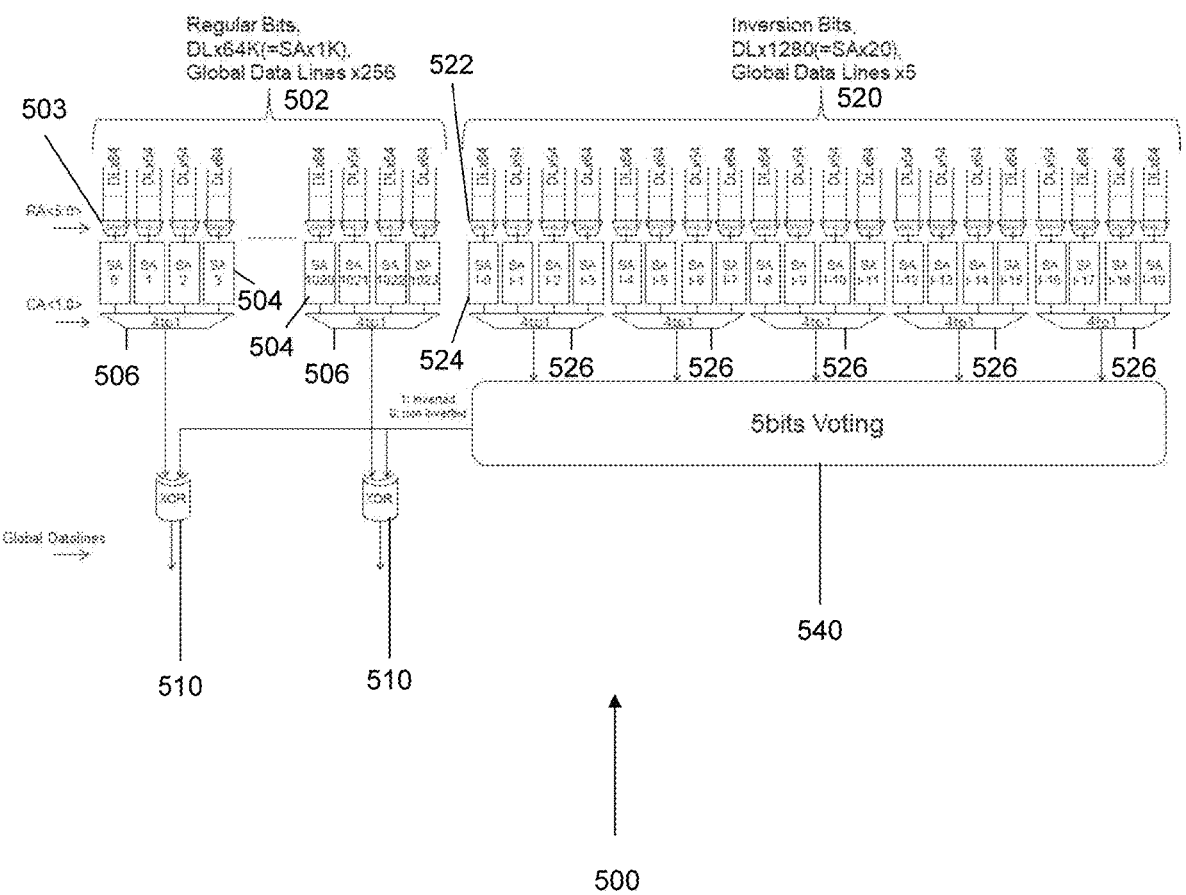
FIG. 5 illustrates an exemplary memory architecture for facilitating voting schemes in a memory page according to embodiments of the present disclosure.

Referring now also to FIG. 5, an exemplary memory architecture 500 for facilitating voting schemes in a memory page according to embodiments of the present disclosure is shown. In certain embodiments, the memory architecture 500 may include data lines 502 for providing regular data bits (e.g., data requested by a host device 150 or other device or component) from memory cells 105 of a memory array of a memory device 100. For example, for illustration purposes only, the number of data lines 502 may be 64 k, as shown in FIG. 5. In certain embodiments, using the previous example, the memory architecture 500 may include multiplexers 503 that have the data lines as inputs to the multiplexers, such as 64 data lines serving as inputs to each multiplexer 503 (e.g., a 64 to 1 multiplexer), which may be configured to select data bits from the data lines, where the selected data bits may be provided to sense amplifiers 504. In certain embodiments, for example, the row addresses may be <5:0> and the column address may be <1:0>. In certain embodiments, the memory architecture 500 may also include a plurality of sense amplifiers 504 (e.g., data sense amplifiers) configured to sense the values (e.g., logic 0 or 1, or other value) of the data bits coming through the data lines 502 via the multiplexers 503. In certain embodiments, using the previous example, there may be roughly 1 k sense amplifiers, with each sense amplifier 504 associated with 64 data lines of the 64 k data lines and each sense amplifier 504 having a corresponding multiplexer 503 providing the input to the sense amplifier 504. In certain embodiments, the memory architecture 500 may also include multiplexers 506, which may be configured to select data bits from the sense amplifiers 504 for transmission to XOR circuitry 510 (or bit flipping circuitry) that may be configured to flip the data bits if the data bits are determined to be inverted by voting circuit 540. In certain embodiments, the outputs of four sense amplifiers 504 may serve as inputs to a 4 to 1 multiplexer 506, however, other arrangements may be utilized as well and different sizes of multiplexers may be utilized. Once the XOR circuitry 510 processes the data bits, the data bits may be provided on global data lines 510 to provide the data bits in final form to the requesting device (e.g., host device). Using the example above, there may be 256 total global data lines in an implementation having 1 k (1024) sense amplifiers and 64 k data lines.

In certain embodiments, using the example above, there may be 1280 data lines of the memory device 100 for inversion bits, a multiplexer 522 where 64 data lines of the 1280 data lines serve as inputs for each multiplexer 522, a sense amplifier 524 (e.g., inversion sense amplifier) for each multiplexer 522 where the multiplexer 522 selected output serves as input to the sense amplifier 524, a multiplexer 526 for 4 sense amplifiers 524 where the outputs of 4 sense amplifiers 524 serve as inputs to a corresponding multiplexer 526 (e.g., 4 to 1 multiplexer), and a voting circuit 540 (e.g., 5 bit voting circuit) where the inversion bits selected by the multiplexers 526 serve as inputs to the voting circuit 540. In certain embodiments, the voting circuit 540 may be configured to tally votes by determining the values of the inversion bits provided by the multiplexers 526. For example, two of the inversion bits may have a logic value of 0 (e.g., indicating that the data bits are not inverted) and three of the inversion bits may have a logic value 1 (e.g., indicating that the data bits are inverted). In certain embodiments, any voting scheme may be used. For example, in certain embodiments, all inversion bits provided to the voting circuit 540 may need to have logic value 1 for the vote to be for inversion of the data bits, some of the inversion bits may need to have a logic value 1, a threshold number of inversion bits may need to have a logic value of 1, a majority of the inversion bits may need to have a logic value of 1, or other voting rule. If, for example, in a majority vote implementation, 3 of the 5 inversion bits are logic value 1 (i.e., the majority vote indicates that the data bits are inverted), the voting circuit 540 may generate and transmit a flip bit with logic value 1 to the XOR circuitry 510 (or bit flipping component) so that the bits may be flipped prior to providing the data bits to a requesting device, such as the host device 150. If, on the other hand, the voting indicates that the data bits are not inverted, the voting circuit 540 may generate a flip bit with value 0 so that the data bits are not flipped by the XOR circuitry 510. In the architecture 500, the cost of adding inversion bits may be 1.95% relative to regular bits using the example above.

Figure 6:
FIG. 6 illustrates an exemplary memory page and codeword structure for facilitating voting schemes in a memory page according to embodiments of the present disclosure.

Referring now also to FIG. 6, an exemplary memory page 600 (or codeword structure) for use with the memory architecture 50) and/or the memory device 100 is shown. As an example, the memory page 600 may include column addresses <1:0>. In certain embodiments, the memory page 600 may include low-low (LL) (e.g. 00 logic values), low-high (LH) (e.g., 01 logic values, high-low (HL) (e.g., 10 logic values), and high-high (HH) (e.g., 11 logic values). As an example, for HH, a portion of the memory page 600 may be dedicated to regular user data bits 620 (e.g. 256 bits), and a portion 630 may be dedicated for error correction bits 632 (e.g., 5 bits), redundancy bits 634 (e.g., 5 bits), and inversion bits 636 (e.g., 5 bits). In certain embodiments, each of the column addresses (LL, LH, HL, HH) may have a portion 630 dedicated to the error correction bits 632, redundancy bits 634, and inversion bits 636, which may require greater memory componentry in the memory device 100 than other implementations as described herein.

Figure 7:
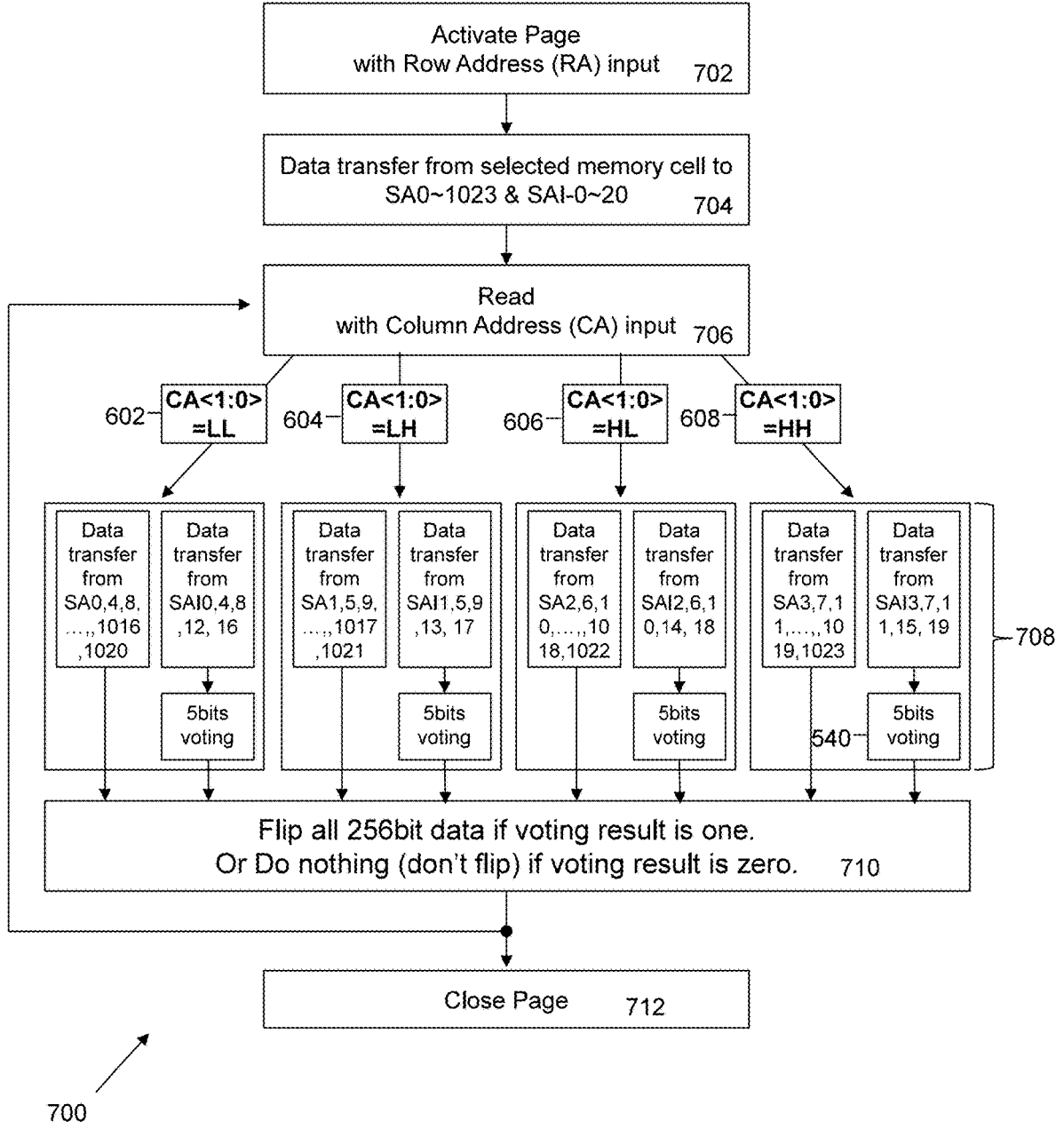
FIG. 7 shows an exemplary method for providing a voting scheme in a memory page in accordance with embodiments of the present disclosure.

Referring now also to FIG. 7, an exemplary method 700 for providing a voting scheme in a memory page in accordance with embodiments of the present disclosure is shown. At 702, the method 700 may include activating the memory page 600 with a row address input, such as based on an activate command issued by a memory controller and/or host device 150. The memory page 600 activated may be the memory page 600 that is determined to have the data bits responsive to a request from the host device 150 or other device. In certain embodiments, at 704, the method 700 may include transferring the data bits from the memory cells (e.g., memory cells to sense amplifiers for the data bits (e.g., data sense amplifiers SA0-SA1023 using the previous example above) and transferring inversion bits to sense amplifiers (e.g., inversion sense amplifiers SAI0-SAI20 using the above example). At 706, the method 700 may include conducting a read operation with the column address as input. In this example, for the column address LL (00 logic values) 602 and when using 4 to 1 multiplexers, the corresponding data bits may be transferred to data sense amplifiers SA0, 4, 8, . . . 1016, 1020. Similarly, the inversion bits may be transferred to inversion sense amplifiers SAI0, 4, 8, 12, and 16. For column address LH (01 logic values) 604 and when using 4 to 1 multiplexers, the corresponding data bits may be transferred to data sense amplifiers SA1, 5, 9, . . . 1017, 1021. Similarly, the inversion bits may be transferred to inversion sense amplifiers SAI1, 5, 9, 13, and 17. For column address HL (10 logic values) 606 and when using 4 to 1 multiplexers, the corresponding data bits may be transferred to data sense amplifiers SA2, 6, 10, . . . 1018, 1022. Similarly, the inversion bits may be transferred to inversion sense amplifiers SA12, 6, 10, 14, and 18. For column address HH (11 logic values) 608 and when using 4 to 1 multiplexers, the corresponding data bits may be transferred to data sense amplifiers SA3, 7, 11, . . . 1019, 1023. Similarly, the inversion bits may be transferred to inversion sense amplifiers SA13, 7, 11, 15, and 19. At 708, the method 700 may include transferring the data bits to the XOR circuitry and the inversion bits to the voting circuit 540 for tabulating the votes for the inversion bits. If the vote indicates that the data bits are inverted, the method 700, at step 710, may include flipping the inverted data bits. If, however, the vote indicates that the data bits are not inverted, the method 700, at step 710, may include not flipping the data bits. The method 700 may be repeated as necessary. At step 712, once the data bits are provided to the requesting device, for example, the memory page 600 may be closed, such as based on a precharge command.

Figure 8:
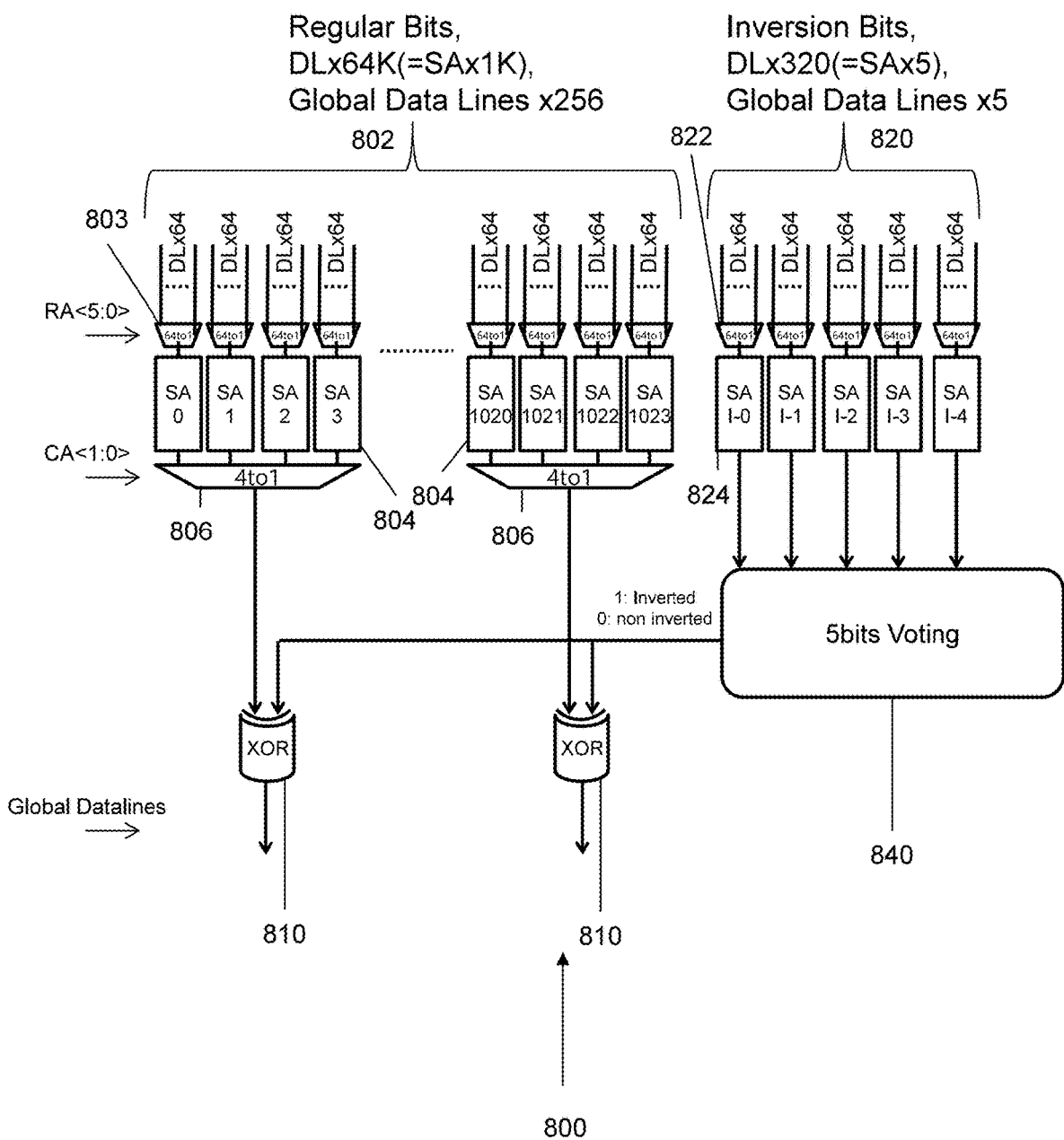
FIG. 8 illustrates an exemplary enhanced memory architecture for facilitating voting schemes in a memory page according to embodiments of the present disclosure.

Referring now also to FIG. 8, an exemplary enhanced memory architecture 800 for facilitating voting schemes in a memory page according to embodiments of the present disclosure is shown. In certain embodiments, the architecture 800 may require less die size, memory space, memory resources, and/or componentry than architecture 500. For example, the architecture 800 may utilizing a special decoding (without requiring data line multiplexers done by column addresses for the inversion bits and directly routing the inversion bits from the sense amplifiers 826 to a voting circuit 840. For example, the cost of adding inversion bits using architecture 800 may be +0.49% relative to the data bits, which provides a substantial enhancement compared to architecture 500. In such an architecture, in certain embodiments, the inversion bits may correspond with the row address(es) of the memory page instead being tied to column addresses in the architecture 500. In certain embodiments, inversion bit functionality may be required per memory page of the memory device 100. In certain embodiments, the memory architecture 800 may include data lines 802 for providing regular data bits (e.g., data requested by a host device 150 or other device or component) from memory cells 105 of a memory array of a memory device 100. For example, for illustration purposes only, the number of data lines 802 may be 64 k, as shown in FIG. 8. In certain embodiments, using the previous example, the memory architecture 800 may include multiplexers 803 that have the data lines as inputs to the multiplexers, such as 64 data lines serving as inputs to each multiplexer 803 (e.g., a 64 to 1 multiplexer), which may be configured to select data bits from the data lines, where the selected data bits may be provided to sense amplifiers 804. In certain embodiments, for example, the row addresses may be <5:0> and the column address may be <1:0>. In certain embodiments, the memory architecture 800 may also include a plurality of sense amplifiers 804 (e.g., data sense amplifiers) configured to sense the values (e.g., logic 0 or 1, or other value) of the data bits coming through the data lines 802 via the multiplexers 803. In certain embodiments, using the previous example, there may be roughly 1 k (1024) sense amplifiers, with each sense amplifier 804 associated with 64 data lines of the 64 k data lines and each sense amplifier 804 having a corresponding multiplexer 803 providing the input to the sense amplifier 804. In certain embodiments, the memory architecture 800 may also include multiplexers 806, which may be configured to select data bits from the sense amplifiers 804 for transmission to XOR circuitry 810 (or bit flipping circuitry) that may be configured to flip the data bits if the data bits are determined to be inverted by voting circuit 840. In certain embodiments, the outputs of four sense amplifiers 804 may serve as inputs to a 4 to 1 multiplexer 806, however, other arrangements may be utilized as well and different sizes of multiplexers may be utilized. Once the XOR circuitry 810 processes the data bits, the data bits may be provided on global data lines 810 to provide the data bits in final form to the requesting device (e.g., host device 150). Using the example above, there may be 256 total global data lines in an implementation having 1 k (1024) sense amplifiers and 64 k data lines.

In certain enhanced embodiments, using the example above, there may be 320 data lines of the memory device 100 for inversion bits (instead of 1280; reduction of a factor by 4 in this example), a multiplexer 822 where 64 data lines of the 320 data lines serve as inputs for each multiplexer 822, a sense amplifier 824 (e.g., inversion sense amplifier; 5 sense amplifiers instead of 20) for each multiplexer 822 where the multiplexer 822 selected output serves as input to the sense amplifier 824, and a voting circuit 840 (e.g., 5 bit voting circuit) where the inversion bits from the sense amplifiers 824 directly serve as inputs to the voting circuit 810 (instead of using multiplexers 526 as used in architecture 500). In certain embodiments, the voting circuit 840 may be configured to tally votes by determining the values of the inversion bits provided by the sense amplifiers 824. For example, two of the inversion bits may have a logic value of 0 (e.g., indicating that the data bits are not inverted) and three of the inversion bits may have a logic value 1 (e.g., indicating that the data bits are inverted). In certain embodiments, any voting scheme may be used. For example, in certain embodiments, all inversion bits provided to the voting circuit 840 may need to have logic value 1 for the vote to be for inversion of the data bits, some of the inversion bits may need to have a logic value 1, a threshold number of inversion bits may need to have a logic value of 1, a majority of the inversion bits may need to have a logic value of 1, or other voting rule. If, for example, in a majority vote implementation, 3 of the 5 inversion bits are logic value 1 (i.e., the majority vote indicates that the data bits are inverted), the voting circuit 840 may generate and transmit a flip bit with logic value 1 to the XOR circuitry 810 (or bit flipping component) so that the bits may be flipped prior to providing the data bits to a requesting device, such as the host device 150. If, on the other hand, the voting indicates that the data bits are not inverted, the voting circuit 840 may generate a flip bit with value 0 so that the data bits are not flipped by the XOR circuitry 810.

Figure 9:
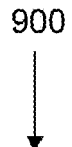
FIG. 9 illustrates an exemplary memory page and codeword structure for facilitating enhanced voting schemes in a memory page according to embodiments of the present disclosure.

Referring now also to FIG. 9, an exemplary memory page 900 and codeword structure for facilitating enhanced voting schemes in a memory page according to embodiments of the present disclosure is shown. As an example, the memory page 900 may include column addresses <1:0> and a row address(es) corresponding to the memory page 900. In certain embodiments, the memory page 900 may include low-low (LL) (e.g. 00 logic values), low-high (LH) (e.g., 01 logic values, high-low (HL) (e.g., 10 logic values), and high-high (HH) (e.g., 11 logic values). As an example, for HH, a portion of the memory page 900 may be dedicated to regular user data bits 920 (e.g. 256 bits), and a portion 930 may be dedicated for error correction bits 932 (e.g., 5 bits) and redundancy bits 934 (e.g., 5 bits). In this architecture 800, however, the inversion bits 936 (e.g., 5 bits) may be taken across the memory page 900 and be associated with the row address, as shown in FIG. 9. In the architecture 500, for example, 5 bits of inversion bits are utilized for each column address, however, in architecture 800, a fewer number of inversion bits for the memory page 900 may be utilized using the voting scheme facilitated by architecture 800.

Figure 10:
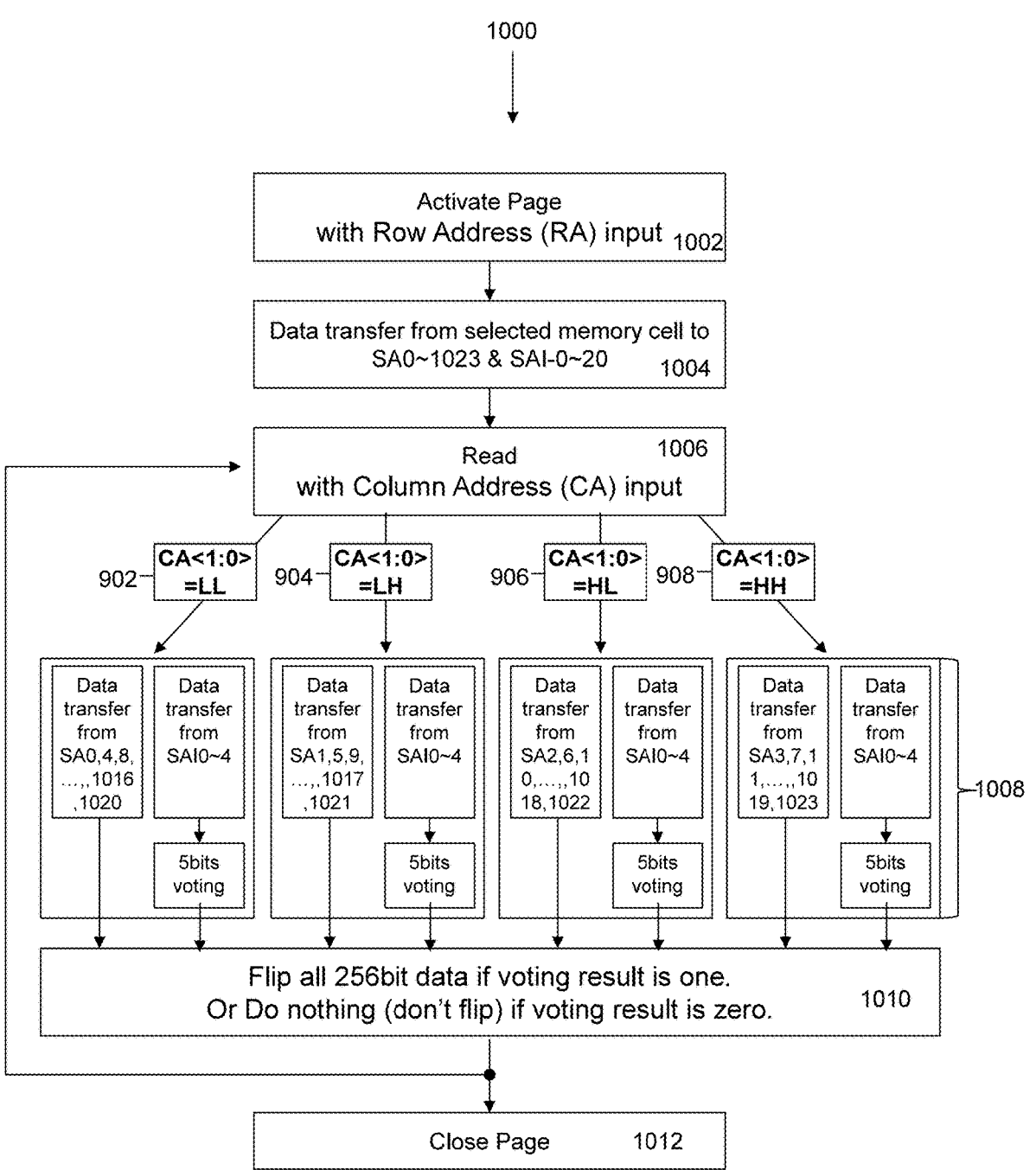
FIG. 10 illustrates an exemplary method for providing an enhanced voting scheme in a memory page in accordance with embodiments of the present disclosure.

Referring now also to FIG. 10, an exemplary method 1000 for providing an enhanced voting scheme in a memory page in accordance with embodiments of the present disclosure is shown. At 1002, the method 1000 may include activating the memory page 900 with a row address input, such as based on an activate command issued by a memory controller and/or host device 150. The memory page 900 activated may be the memory page 900 that is determined to have the data bits responsive to a request from the host device 150 or other device. In certain embodiments, at 1004, the method 1000 may include transferring the data bits from the memory cells (e.g., memory cells to sense amplifiers for the data bits (e.g., data sense amplifiers SA0-SA1023 using the example above) and transferring inversion bits to sense amplifiers (e.g., inversion sense amplifiers SAI0-SAI4 using the above example). At 1006, the method 1000 may include conducting a read operation with the column address as input. In this example, for the column address LL (00 logic values) 902 and when using 4 to 1 multiplexers, the corresponding data bits may be transferred to data sense amplifiers SA0, 4, 8, . . . 1016, 1020. However, the inversion bits may be transferred to inversion sense amplifiers SAI0~4. For column address LH (01 logic values) 904 and when using 4 to 1 multiplexers, the corresponding data bits may be transferred to data sense amplifiers SA1, 5, 9, . . . 1017, 1021. However, the inversion bits may be transferred to inversion sense amplifiers SAI0~4. For column address HL (10 logic values) 906 and when using 4 to 1 multiplexers, the corresponding data bits may be transferred to data sense amplifiers SA2, 6, 10, . . . 1018, 1022. However, the inversion bits may be transferred to inversion sense amplifiers SAI0~4. For column address HH (11 logic values) 908 and when using 4 to 1 multiplexers, the corresponding data bits may be transferred to data sense amplifiers SA3, 7, 11, . . . 1019, 1023. However, the inversion bits may be transferred to inversion sense SAI0~4. At 1008, the method 1000 may include transferring the data bits to the XOR circuitry and the inversion bits to the voting circuit 840 for tabulating the votes for the inversion bits. If the vote indicates that the data bits are inverted, the method 1000, at step 1010, may include flipping the inverted data bits. If, however, the vote indicates that the data bits are not inverted, the method 1000, at step 1010, may include not flipping the data bits. The method 1000 may be repeated as necessary. At step 1012, once the data bits are provided to the requesting device, for example, the memory page 900 may be closed, such as based on a precharge command.

Figure 11:
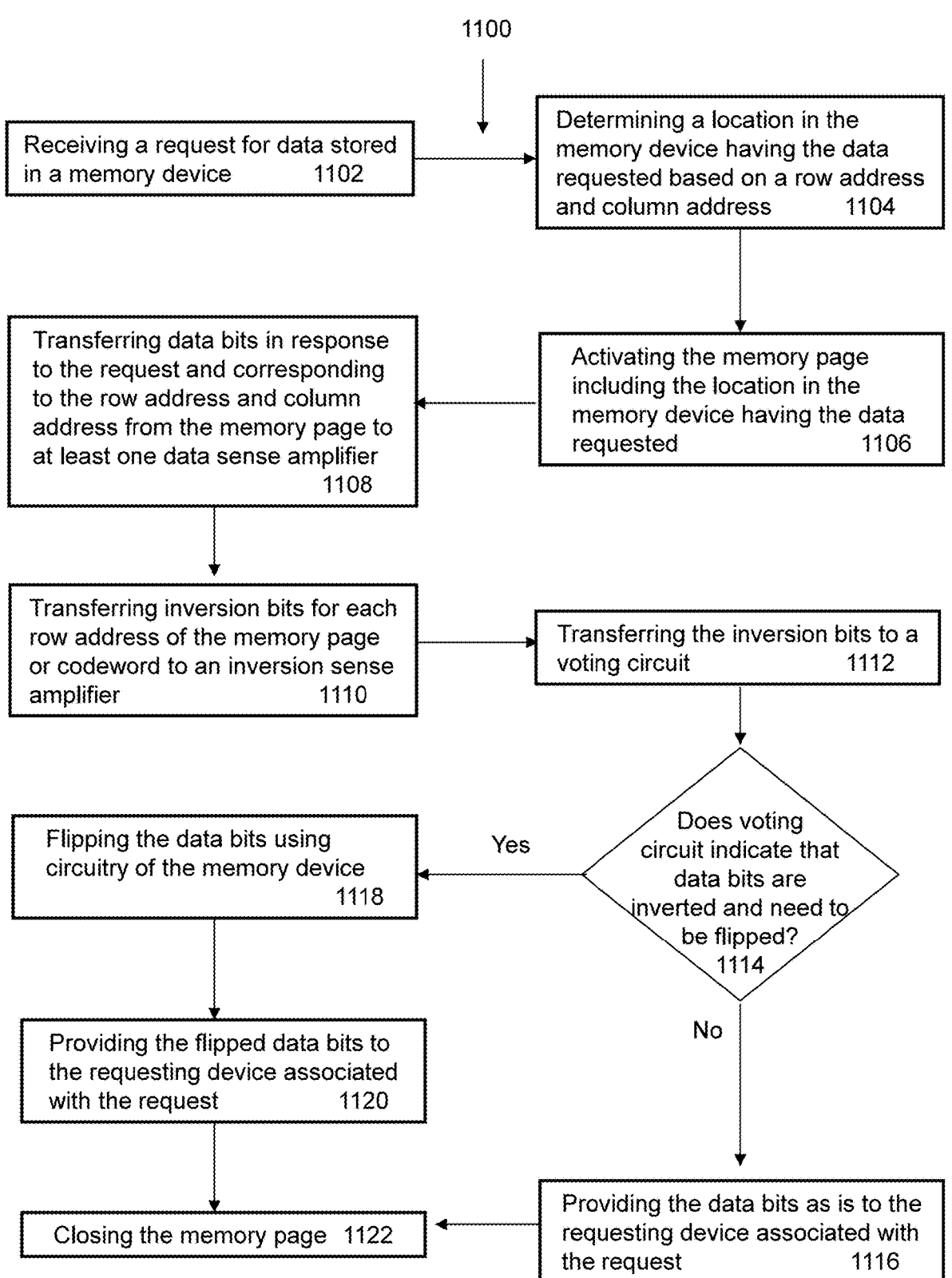
FIG. 11 illustrates an exemplary method for processing requests for data and providing the data to a recipient using a voting scheme in a memory page in accordance with embodiments of the present disclosure.

Referring now also to FIG. 11, FIG. 11 illustrates an exemplary method 1100 for providing a voting scheme in a memory page according to embodiments of the present disclosure. For example, the method of FIG. 11 can be implemented in the memory device 100 of FIG. 1 and/or any of the other systems, devices, and/or componentry illustrated in the Figures. In certain embodiments, the method of FIG. 11 can be performed by processing logic that can include hardware (e.g., processing device, circuitry, dedicated logic, programmable logic, microcode, hardware of a device, integrated circuit, deep learning accelerator, etc.), software (e.g., instructions run or executed on a processing device), or a combination thereof. In some embodiments, the method of FIG. 11 may be performed at least in part by one or more processing devices. Although shown in a particular sequence or order, unless otherwise specified, the order of the steps in the method 1100 may be modified and/or changed depending on implementation and objectives. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 1100 may include steps for providing voting schemes in memory pages of memory devices that facilitate determination as to whether to flip data bits of a memory page. Notably, the voting schemes provided by the method 1100 utilize fewer memory resources, computing resources, reduced memory die size, and inversion bits than other voting scheme technologies. The method 1100 may include, for example, steps for receiving requests for data, determining where the requested data resides on a memory device (e.g., memory device 100), activating memory pages containing the requested data, transferring data bits to sense amplifiers and to multiplexers, transferring inversion bits to sense amplifiers (e.g., inversion bits for a row address(es) of a memory page), transferring inversion bits to a voting circuit, conducting a vote using the inversion bits to determine if data bits are inverted, flipping the data bits if the data bits are voted to be inverted, providing the flipped data bits to a requesting device or system, and closing the memory page. In certain embodiments, the method 1100 may be performed by utilizing the memory device 100, and/or by utilizing any combination of the componentry and any other systems and devices described herein or otherwise.

At step 1102, the method 1100 may include receiving a request for data stored in a memory device (e.g., memory device 100). For example, the request for data may be to access data necessary for a software process, provide data to a user requiring the data for some purpose, or a combination thereof. In certain embodiments, the data may be any type of data including, but not limited to, video content, image content, text content, metadata, augmented reality content, virtual reality content, audio content, information, any type of data, or a combination thereof. In certain embodiments, the request may include an identification of a row address and/or column address of a memory page of the memory device storing the data. In certain embodiments, the request may include an identity of the requesting device requesting the data, an indication of the type of data being requested, a size of the data, the location of the data, any other information, or a combination thereof. In certain embodiments, the request for data may be issued by a device, such as host device 150, however, in certain embodiments, the request for data may be from another device, a software process, a memory controller 140 of the memory device 100, or a combination thereof. In certain embodiments, the requesting of the data may be performed and/or facilitated by utilizing the host device 150, the memory device 100, the memory controller 140, any other program, system, or device, or a combination thereof.

At step 1104, the method 1100 may include determining a location in the memory device having the data requested in the request. For example, in certain embodiments, the memory device 100 may determine the location in the memory device 100 storing the data based on analyzing the request. In certain embodiments, the memory device 100 may analyze a row address and/or column address specified in the request to identify the location in a memory page of the memory device 100 storing data bits corresponding to the data. In certain embodiments, the memory controller 140 may be configured to determine the location storing the data corresponding to the request. In certain embodiments, the determining of the location in the memory device may be performed and/or facilitated by utilizing the host device 150, the memory device 100, the memory controller 140, any other program, system, or device, or a combination thereof. At step 1106, the method 1100 may include activating the memory page including the location in the memory device having the requested data. For example, an activate command may be issued by the host device 150, the memory controller 140, any other device, or a combination thereof, to activate and open the memory page. In certain embodiments, the activate command may be utilized to open up a row in a memory page of the memory array of the memory device 100 and may facilitate transfer of charge from capacitors of the memory device 100 to sense amplifiers of the memory device so that the values (e.g., logic 0 or 1) of the data bits stored in the memory cells of the memory page may be determined.

At step 1108, the method 1100 may include transferring inversion bits stored in the memory page for each row address of the memory page (or codeword or other memory unit) to sense amplifiers. In certain embodiments, the number of inversion bits may correspond with the number of sense amplifiers, which may be utilized to determine the value of each inversion bit (e.g., a logic 0 or 1). In certain embodiments, the transferring of the inversion bits may be performed and/or facilitated by utilizing the memory device 100, the memory controller 140, any other program, system, or device, or a combination thereof. At step 1112, the method 1100 may include transferring the inversion bits to a voting circuit (e.g., voting circuits 540, 840) to conducting voting. In certain embodiments, the voting may consist of tabulating the number of inversion bits indicating that data bits have been inverted. For example, a logic 0 value for an inversion bit may indicate that the data bits have not been inverted (e.g., data bit has a 0 value, and the data bit should have a 0 value), and a logic 1 value for an inversion bit may indicate that the data bits have been inverted (e.g., data bit should have been a 1 value when it is currently a 0 value). In certain embodiments, the voting may be performed and/or facilitated by utilizing the memory device 100, the memory controller 140, any other program, system, or device, or a combination thereof.

At step 1114, the method 1100 may include determining whether the voting conducted utilizing the voting circuit indicates that the data bits are inverted. In certain embodiments, the voting may indicate that the data bits are inverted if a threshold number of corresponding inversion bits indicate that the data bits are inverted, if a majority of the inversion bits indicate that the data bits are inverted, if all of the inversion bits indicate that the data bits are inverted, or if at least one inversion bit indicates that the data bits are inverted. In certain embodiments, the determining of the voting may be performed and/or facilitated by utilizing the memory device 100, the memory controller 140, any other program, system, or device, or a combination thereof. If, at step 1114, the voting indicates that the data bits are not inverted, the method 1100 may proceed to step 1116. At step 1116, the method 1100 may include providing the data bits in their current as-is form to the requesting device (e.g., host device 150) that issued the request for the data associated with the data bits. In certain embodiments, the providing of the data bits may include providing the data bits to a multiplexer(s) and then to an XOR logic circuit that does not flip the data bits, which then passes the data bits to a global data line of the memory device 100, and ultimately to the requesting device. In certain embodiments, the providing of the data bits may be performed and/or facilitating by the memory device 100, the memory controller 140, any other program, system, or device, or a combination thereof. At step 1122, the method 1100 may include closing the memory page. In certain embodiments, the memory page may be closed based on issuance of a precharge command to close the memory page. In certain embodiments, the closing of the memory page may be performed and/or facilitated by the memory device 100, the memory controller 140, any other program, system, or device, or a combination thereof.

If, however, at step 1114, the voting indicates that the data bits are inverted, the method 1100 may proceed to step 1118, which may include flipping the data bits using logic circuitry of the memory device 100. For example, XOR circuitry and/or a flipping component of the memory device 100 may be utilized to flip the data bits coming from the sense amplifiers and subsequent multiplexers to generate flipped data bits that may be provided to the global data line(s) of the memory device 100. In certain embodiments, the flipping of the data bits may be performed and/or facilitated by the memory device 100, the memory controller 140, any other program, system, or device, or a combination thereof. At step 1120, the method 1100 may include providing the flipped data bits to the requesting device associated with the request. In certain embodiments, the providing of the flipped data bits may be performed and/or facilitated by utilizing the memory device 100, the memory controller 140, any other program, system, or device, or a combination thereof. At step 1122, the method 1100 may include closing the memory page, such as based on issuance of a precharge command by the memory device 100 and/or host device 150. In certain embodiments, the method 1100 may be repeated as desired and/or by the memory device 100, other components of the FIG. 1, any system, a device, or a combination thereof. Notably, the method 1100 may incorporate any of the other functionality as described herein and may be adapted to support the functionality of the present disclosure.

Figure 12:
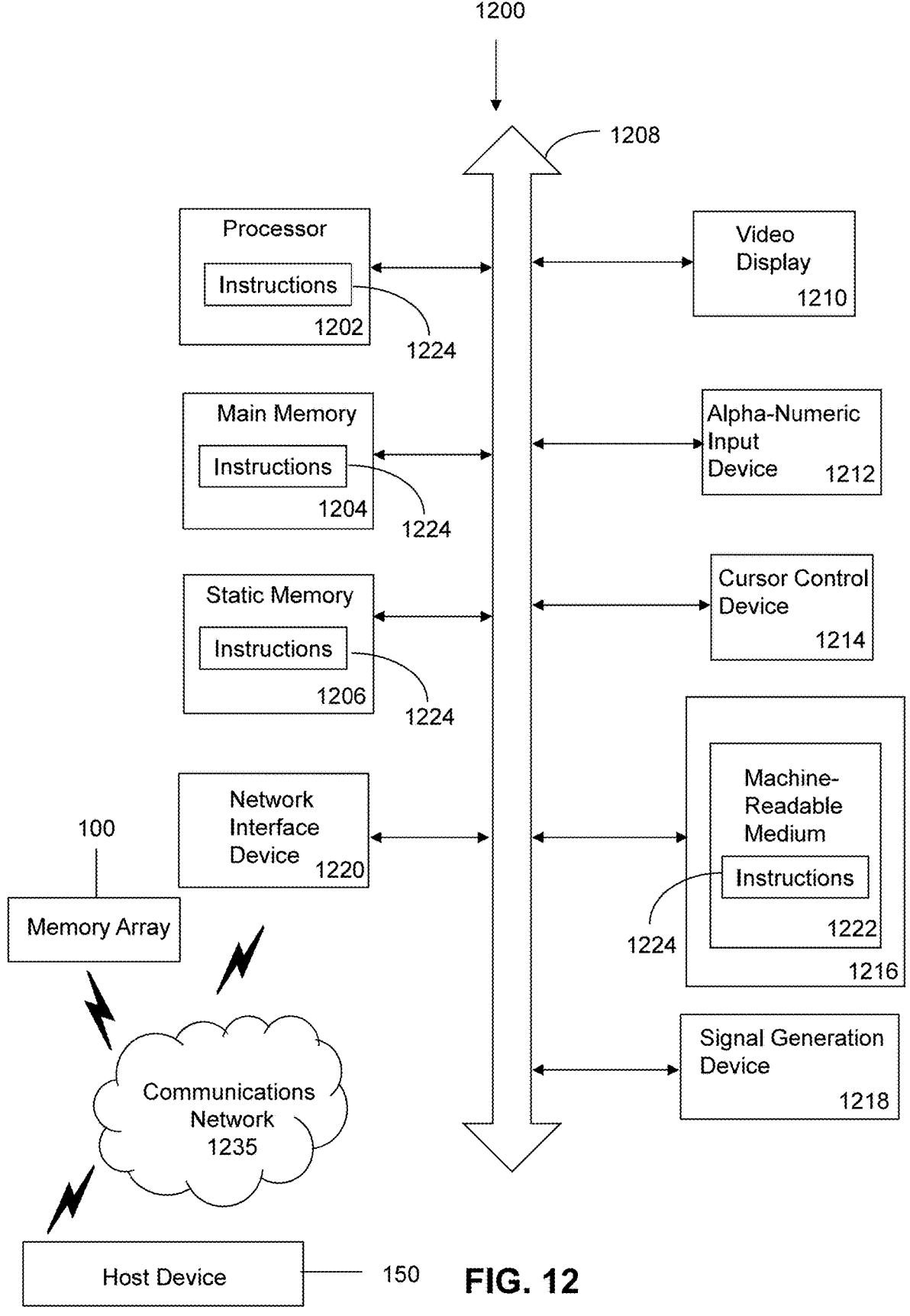
FIG. 12 illustrates a schematic diagram of a machine in the form of a computer system within which a set of instructions, when executed, may cause the machine to facilitate a voting scheme in a memory page according to embodiments of the present disclosure.

Referring now also to FIG. 12, at least a portion of the methodologies and techniques described with respect to the exemplary embodiments of the memory device 100, componentry, and/or methods 700, 1000, 1100 can incorporate a machine, such as, but not limited to, computer system 1200, or other computing device within which a set of instructions, when executed, may cause the machine to perform any one or more of the methodologies or functions discussed above. The machine may be configured to facilitate various operations conducted by the memory device 100, the host device 150, any other device described herein, or a combination thereof. For example, the machine may be configured to, but is not limited to, assist the memory device 100 by providing processing power to assist with processing loads experienced in a system including the memory array 100, by providing storage capacity for storing instructions or data traversing a system including the memory device 100, or by assisting with any other operations conducted by or within a system including the memory device 100. As another example, in certain embodiments, the computer system 1200 may assist in receiving requests for data stored in a memory device (e.g., such as from a host device 150), determining locations within a memory device that store requested data, activating memory pages including the determined locations in the memory devices that have the requested data, transferring data bits from memory cells to sense amplifiers to identify values of the data bits stored in the memory cells of the memory pages, transferring inversion bits to sense amplifiers, transferring inversion bits to voting circuits, tally votes associated with the inversion bits to determine whether to flip bits or not, providing original data bits or flipped bits to a device (e.g., host device 150) requesting the data, closing memory pages, and/or performing any other operations described in the present disclosure.

In some embodiments, the machine may operate as a standalone device. In some embodiments, the machine may be connected (e.g., using communications network 1235, another network, or a combination thereof) to and assist with operations performed by other machines and systems, such as, but not limited to, the memory device 100, the host device 150, any other system, program, and/or device, or any combination thereof. The machine may be connected with any component in the memory device 100, the host device 150, and/or other devices of the present disclosure. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1200 may include a processor 1202 (e.g., a central processing unit (CPU), a graphics processing unit (GPU, or both), a main memory 1204 and a static memory 1206, which communicate with each other via a bus 1208. The computer system 1200 may further include a video display unit 1210, which may be, but is not limited to, a liquid crystal display (LCD), a flat panel, a solid-state display, or a cathode ray tube (CRT). The computer system 1200 may include an input device 1212, such as, but not limited to, a keyboard, a cursor control device 1214, such as, but not limited to, a mouse, a disk drive unit 1216, a signal generation device 1218, such as, but not limited to, a speaker or remote control, and a network interface device 1220.

The disk drive unit 1216 may include a machine-readable medium 1222 on which is stored one or more sets of instructions 1224, such as, but not limited to, software embodying any one or more of the methodologies or functions described herein, including those methods illustrated above. The instructions 1224 may also reside, completely or at least partially, within the main memory 1204, the static memory 1206, or within the processor 1202, or a combination thereof, during execution thereof by the computer system 1200. The main memory 1204 and the processor 1202 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1222 containing instructions 1224 so that a device connected to the communications network 1235, another network, or a combination thereof, can send or receive voice, video or data, and communicate over the communications network 1235, another network, or a combination thereof, using the instructions. The instructions 1224 may further be transmitted or received over the communications network 1235, another network, or a combination thereof, via the network interface device 1220.

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure is not limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A system, comprising:

a host device;

a memory array comprising a plurality of memory cells configured to store a plurality of data bits and a plurality of inversion bits, wherein each inversion bit is associated with a respective row and indicates whether corresponding data bits of the plurality of data bits in the respective row are stored in an inverted state; and a controller communicatively linked to the memory array, wherein the controller is configured to:

receive, from the host device, a request to read data stored in the memory array;

determine, based on a row address and a column address specified in the request, a memory page of the memory array storing the data;

cause, by at least one sense amplifier, sensing of inversion bits of the plurality of inversion bits for row addresses of the memory page of the memory array;

read the sensed inversion bits and provide the sensed inversion bits to a voting circuit;

determine, via the voting circuit, whether a majority of the inversion bits indicate that the data bits are stored in an inverted state;

flip, in response to the majority of the inversion bits indicating that the data bits are stored in the inverted state, the data bits to generate flipped data bits; and provide the flipped data bits to the host device.

2. The system of claim 1, wherein the controller is further configured to determine that the majority of the inversion bits indicate that the data bits are not stored in the inverted state.

3. The system of claim 2, wherein the controller is further configured to provide the data bits to the host device without conducting a flipping operation on the data bits if the majority of the inversion bits indicate that the data bits are not stored in the inverted state.

4. The system of claim 1, wherein the controller is further configured to close the memory page after providing the flipped data bits to the host device.

5. The system of claim 1, wherein the controller is further configured to activate the memory page after determination of the memory page based on the row address and the column address specified in the request.

6. The system of claim 1, wherein the controller is further configured to transfer the data bits from the at least one data sense amplifier to a multiplexer configured to select a portion of the data bits for providing in response to the request.

7. The system of claim 6, wherein the controller is further configured to transfer the data bits from the multiplexer to XOR logic circuitry to flip the data bits.

8. The system of claim 1, wherein the controller is further configured to transfer the inversion bits associated with the row addresses the memory page to a corresponding inversion sense amplifier prior to transferring the inversion bits to the voting circuit.

9. The system of claim 1, wherein the controller is further configured to maintain storage of the inversion bits in the memory array.

10. The system of claim 1, wherein the controller is further configured to provide the inversion bits to the voting circuit without transferring the inversion bits for each row address to a multiplexer.

11. The system of claim 1, wherein the controller is further configured to repair the data bits using redundant bits prior to flipping the data bits.

12. The system of claim 1, wherein the controller is further configured to determine whether the data bits have been corrupted by utilizing at least one error correction bit.

13. The system of claim 1, wherein the controller is further configured to provide the flipped data bits to a global data line prior to providing the flipped data bits to the host device.

14. A method, comprising:

receiving, at a memory device, a request from a host device for data stored in a memory array of the memory device, wherein the memory array is configured to store a plurality of data bits and a plurality of inversion bits, wherein each inversion bit is associated with a respective row and indicates whether corresponding data bits of the plurality of data bits in the respective row are stored in an inverted state;

identifying, in response to the request, a memory page of the memory array storing the data;

causing, by at least one sense amplifier, sensing of inversion bits of the plurality of inversion bits for row addresses of the memory page of the memory array;

transferring the inversion bits sensed for the row addresses to a voting circuit;

determining, via the voting circuit, whether a majority of the inversion bits indicate that the data bits are not stored in an inverted state; and providing, in response to determining that the majority of the inversion bits indicate that the data bits are not stored in the inverted state, the data bits to the host device without flipping the data bits.

15. The method of claim 14, further comprising determining that the majority of the inversion bits indicate that the data bits of the memory page are stored in the inverted state.

16. The method of claim 15, further comprising flipping the data bits prior to providing the data bits based on the determination that the majority of the inversion bits indicate that the data bits are stored in the inverted state.

17. The method of claim 14, further comprising directly routing the inversion bits to the voting circuit without passing the inversion bits to a multiplexer.

18. The method of claim 14, further comprising setting the inversion bits.

19. A memory device, comprising:

a controller configured to:

determine, based on a request for data, that a memory page of a memory array of the memory device stores data bits associated with the data and a plurality of inversion bits, wherein each inversion bit of the plurality of inversion bits is associated with a respective row and indicates whether corresponding data bits of the plurality of data bits in the respective row are stored in an inverted state;

cause, by at least one sense amplifier, sensing of inversion bits of the plurality of inversion bits for row addresses of the memory page of the memory array;

transfer, to a voting circuit, inversion bits sensed for the row addresses of the memory page;

conduct, via the voting circuit, a vote using the inversion bits to determine whether a majority of the inversion bits indicate that the data bits are stored in an inverted state;

in response to a determination that the vote indicates that the data bits are in an inverted state:

flip the data bits to generate flipped data bits; and provide the flipped data bits in response to the request; and in response to a determination that the vote indicates that the data bits are not in the inverted state:

provide the data bits in response to the request.

20. The memory device of claim 19, wherein the controller is further configured to perform error correction, redundancy repair, or a combination thereof, prior to flipping the data bits to generate the flipped data bits.

*   *   *   *   *